US012284020B2

(12) United States Patent
Paidimarri et al.

(10) Patent No.: US 12,284,020 B2
(45) Date of Patent: Apr. 22, 2025

(54) AMPLITUDE AND PHASE ALIGNMENT OF PHASED ARRAY ELEMENTS

(71) Applicant: International Business Machines Corporation, Armonk, NY (US)

(72) Inventors: Arun Paidimarri, South Salem, NY (US); Wooram Lee, Briarcliff Manor, NY (US); Armagan Dascurcu, New York, NY (US); Bodhisatwa Sadhu, Peekskill, NY (US); Alberto Valdes Garcia, Chappaqua, NY (US); Caglar Ozdag, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 17/947,223

(22) Filed: Sep. 19, 2022

(65) Prior Publication Data
US 2024/0097772 A1    Mar. 21, 2024

(51) Int. Cl.
*H04B 7/08* (2006.01)
*H04B 1/30* (2006.01)
*H04B 7/06* (2006.01)

(52) U.S. Cl.
CPC .............. *H04B 7/086* (2013.01); *H04B 1/30* (2013.01); *H04B 7/0682* (2013.01); *H04B 2001/307* (2013.01)

(58) Field of Classification Search
None
See application file for complete search history.

(56) References Cited

U.S. PATENT DOCUMENTS

| 5,657,023 A * | 8/1997 | Lewis | H01Q 3/267 |
| | | | 342/174 |
| 7,269,098 B2 * | 9/2007 | Nishida | G01S 7/524 |
| | | | 367/137 |

(Continued)

FOREIGN PATENT DOCUMENTS

| AU | 2009272440 A1 * | 3/2011 | ............... H01Q 1/32 |
| AU | 2020208478 A1 * | 5/2021 | ............... H01Q 3/26 |

(Continued)

OTHER PUBLICATIONS

Jing et al, "TP for LTE MIMD OTA Test Plan for Two-stage based Methodology", Agilent Technologies.

(Continued)

*Primary Examiner* — Berhanu Tadese
(74) *Attorney, Agent, or Firm* — Scully, Scott, Murphy & Presser, P.C.; Daniel Morris

(57) ABSTRACT

Systems and methods for operating a beamforming circuit are described. A processor can activate a transmitting element among a plurality of transmitting elements of a beamforming circuit. The processor can activate a receiving element among a plurality of receiving elements of a beamforming circuit. The processor can receive a direct current (DC) signal that represents phase and amplitude of the activated transmitting element and the activated receiving element. The processor can adjust a setting of the beamforming circuit to receive additional DC signals that represent phases and amplitudes of the activated transmitting element and the activated receiving element under the adjusted setting. The processor can determine calibration values for the beamforming circuit based on the DC signal and the additional DC signals.

19 Claims, 9 Drawing Sheets

(56) References Cited

U.S. PATENT DOCUMENTS

| | | | | |
|---|---|---|---|---|
| 7,602,336 | B2 * | 10/2009 | Dybdal | H01Q 21/0006 |
| | | | | 342/372 |
| 7,865,236 | B2 * | 1/2011 | Cory | A61B 5/4041 |
| | | | | 607/48 |
| 8,195,118 | B2 * | 6/2012 | Warnick | H01Q 3/26 |
| | | | | 342/368 |
| 8,199,048 | B1 * | 6/2012 | Medina Sanchez | G01S 7/4004 |
| | | | | 342/174 |
| 8,872,719 | B2 * | 10/2014 | Warnick | H01Q 21/061 |
| | | | | 343/853 |
| 9,019,153 | B1 * | 4/2015 | Schuss | G01S 7/40 |
| | | | | 342/174 |
| 9,025,714 | B2 * | 5/2015 | Lee | H04L 1/205 |
| | | | | 455/325 |
| 9,300,040 | B2 * | 3/2016 | Mayo | H01Q 3/34 |
| 9,322,911 | B1 * | 4/2016 | Sacco | H01Q 21/205 |
| 9,356,769 | B2 * | 5/2016 | Lin | H04B 1/30 |
| 9,496,611 | B2 * | 11/2016 | Vagman | H01Q 25/00 |
| 9,621,337 | B2 * | 4/2017 | Hao | H04B 17/21 |
| 10,008,772 | B2 * | 6/2018 | Mayo | H01Q 3/2605 |
| 10,128,894 | B1 * | 11/2018 | O'Brien | H04B 17/12 |
| 10,225,067 | B2 * | 3/2019 | Banu | H04L 7/033 |
| 10,270,583 | B2 * | 4/2019 | Hiebert | H04L 7/02 |
| 10,833,781 | B2 * | 11/2020 | Garcia | H04B 17/12 |
| 10,879,740 | B2 * | 12/2020 | Hosseini | H02J 50/20 |
| 11,158,940 | B2 * | 10/2021 | Rafique | H01Q 3/267 |
| 11,226,405 | B2 * | 1/2022 | Heller | G01S 13/524 |
| 11,322,987 | B2 * | 5/2022 | Nakao | H02J 50/80 |
| 11,901,636 | B2 * | 2/2024 | Orozco Valdes | H01Q 13/24 |
| 11,949,634 | B1 * | 4/2024 | Labadie | H03G 3/3078 |
| 12,034,207 | B2 * | 7/2024 | Nellen | H01Q 15/0033 |
| 2006/0068707 | A1 * | 3/2006 | Greeley | H04B 7/084 |
| | | | | 455/42 |
| 2008/0303742 | A1 * | 12/2008 | Dybdal | H01Q 21/0006 |
| | | | | 343/893 |
| 2011/0082383 | A1 * | 4/2011 | Cory | A61B 5/4893 |
| | | | | 600/547 |
| 2011/0122026 | A1 * | 5/2011 | DeLaquil | H01Q 3/2682 |
| | | | | 342/372 |
| 2014/0192923 | A1 * | 7/2014 | Matsuo | H01Q 3/28 |
| | | | | 375/296 |
| 2017/0077613 | A1 * | 3/2017 | Banu | H04B 17/364 |
| 2018/0269995 | A1 * | 9/2018 | Li | H04B 17/14 |
| 2020/0341112 | A1 * | 10/2020 | Itkin | G01S 7/4078 |
| 2021/0013602 | A1 * | 1/2021 | Bates | G01S 7/4052 |
| 2021/0258883 | A1 * | 8/2021 | Chiu | H04W 52/08 |
| 2021/0328343 | A1 * | 10/2021 | Valdes Garcia | G01R 29/10 |
| 2021/0376465 | A1 * | 12/2021 | Dastjerdi | H01P 1/185 |
| 2022/0069461 | A1 * | 3/2022 | Huang | H01Q 1/246 |
| 2022/0140497 | A1 * | 5/2022 | Orozco Valdes | H01Q 1/02 |
| | | | | 342/361 |
| 2022/0149900 | A1 * | 5/2022 | Llorens Del Rio | H04B 7/022 |
| 2022/0264322 | A1 * | 8/2022 | Choi | H04B 7/0695 |
| 2022/0368015 | A1 * | 11/2022 | Nellen | H01Q 9/285 |
| 2024/0097772 | A1 * | 3/2024 | Paidimarri | H04B 1/30 |

FOREIGN PATENT DOCUMENTS

| | | | | |
|---|---|---|---|---|
| BR | 112021012915 | A2 * | 9/2021 | H01Q 3/26 |
| CA | 2731124 | A1 * | 1/2010 | H01Q 1/32 |
| CA | 3125509 | A1 * | 7/2020 | H01Q 3/26 |
| CA | 3087814 | C * | 6/2023 | H01Q 3/267 |
| CN | 1255997 | A * | 6/2000 | G06K 19/0723 |
| CN | 1535510 | A | 10/2004 | |
| CN | 202333144 | U * | 7/2012 | |
| CN | 202523847 | U * | 11/2012 | |
| CN | 104158539 | A * | 11/2014 | |
| CN | 205003278 | U * | 1/2016 | |
| CN | 104158539 | B * | 5/2017 | |
| CN | 107369878 | A * | 11/2017 | H01Q 1/28 |
| CN | 107534454 | A * | 1/2018 | H01Q 21/06 |
| CN | 108809447 | A * | 11/2018 | H04B 17/102 |
| CN | 109541558 | A * | 3/2019 | |
| CN | 109547041 | A * | 3/2019 | H04B 1/04 |
| CN | 109557519 | A * | 4/2019 | G01S 7/40 |
| CN | 107534454 | B * | 11/2019 | H01Q 21/06 |
| CN | 110429723 | A * | 11/2019 | H02J 50/20 |
| CN | 110521277 | A * | 11/2019 | H02J 50/12 |
| CN | 109547041 | B * | 1/2020 | H04B 1/04 |
| CN | 111641464 | * | 8/2020 | H04B 17/12 |
| CN | 111641464 | A * | 9/2020 | G01R 29/10 |
| CN | 111736119 | A * | 10/2020 | G01S 13/02 |
| CN | 111766300 | A * | 10/2020 | G01B 7/18 |
| CN | 112385086 | A * | 2/2021 | H01Q 3/267 |
| CN | 109977525 | B * | 3/2021 | |
| CN | 113078548 | A * | 7/2021 | H01S 3/13 |
| CN | 108880703 | B * | 8/2021 | H04B 1/403 |
| CN | 109975620 | B * | 8/2021 | |
| CN | 112385086 | B * | 8/2021 | H01Q 3/267 |
| CN | 113302800 | A * | 8/2021 | H01Q 3/26 |
| CN | 113424366 | A * | 9/2021 | H01Q 3/267 |
| CN | 111193560 | B * | 10/2021 | H04B 17/12 |
| CN | 113690554 | A * | 11/2021 | |
| CN | 113934965 | A * | 1/2022 | G06F 17/10 |
| CN | 114205009 | A * | 3/2022 | H04B 17/21 |
| CN | 114300865 | A * | 4/2022 | |
| CN | 111641464 | B * | 5/2022 | G01R 29/10 |
| CN | 114726113 | A * | 7/2022 | |
| CN | 115603738 | A * | 1/2023 | |
| CN | 111766300 | B * | 2/2023 | G01B 7/18 |
| CN | 115754922 | A * | 3/2023 | |
| CN | 114129920 | B * | 9/2023 | |
| CN | 117155442 | A * | 12/2023 | |
| CN | 111736119 | B * | 1/2024 | G01S 13/02 |
| CN | 114300865 | B * | 6/2024 | |
| DE | 10235828 | A1 * | 7/2003 | B64G 1/428 |
| DE | 112018005256 | T5 * | 7/2020 | H04B 1/04 |
| EP | 2311140 | B1 * | 6/2016 | H01Q 1/32 |
| EP | 3086407 | A1 * | 10/2016 | H01Q 1/32 |
| EP | 2273614 | B1 | 12/2017 | |
| EP | 3347993 | A1 | 7/2018 | |
| EP | 3347994 | B1 * | 10/2019 | H01Q 1/241 |
| EP | 3925031 | A1 * | 12/2021 | H01Q 3/267 |
| EP | 3114781 | B1 * | 4/2022 | H01Q 3/267 |
| EP | 3867974 | B1 * | 11/2022 | H01Q 1/38 |
| EP | 3900229 | B1 * | 10/2023 | G01S 5/0221 |
| ES | 2276082 | T3 * | 6/2007 | H03D 3/04 |
| GB | 2171849 | A * | 9/1986 | H01Q 3/267 |
| GB | 2461921 | A * | 1/2010 | H01Q 1/32 |
| GB | 2474923 | A * | 5/2011 | H01Q 1/3216 |
| IL | 210607 | A * | 12/2012 | H01Q 1/32 |
| JP | 3357366 | B2 * | 12/2002 | H01Q 3/267 |
| JP | 2002353865 | A * | 12/2002 | H01Q 3/26 |
| JP | 3584925 | B2 * | 11/2004 | B64G 1/428 |
| JP | 3787159 | B2 * | 6/2006 | G01S 7/03 |
| JP | 2013152135 | A * | 8/2013 | |
| JP | 6955484 | B2 * | 10/2021 | H01Q 1/241 |
| JP | 7025838 | B2 * | 2/2022 | H01H 59/0009 |
| MY | 151999 | A * | 8/2014 | H01Q 1/32 |
| RU | 2240575 | C2 * | 11/2004 | |
| RU | 2699946 | C1 * | 9/2019 | |
| WO | WO-02095983 | A1 * | 11/2002 | H01Q 3/26 |
| WO | WO-2006044868 | A1 * | 4/2006 | A61B 5/0536 |
| WO | WO-2010007442 | A1 * | 1/2010 | H01Q 1/32 |
| WO | WO-2011148248 | A2 * | 12/2011 | H01Q 3/385 |
| WO | WO-2013018365 | A1 * | 2/2013 | H01Q 3/2605 |
| WO | WO-2014091475 | A * | 6/2014 | H01Q 21/296 |
| WO | WO-2016202258 | A1 * | 12/2016 | H04B 17/21 |
| WO | WO-2017044528 | A1 * | 3/2017 | H01Q 1/241 |
| WO | WO-2019000168 | A1 * | 1/2019 | G01F 1/28 |
| WO | WO-2020150582 | A1 * | 7/2020 | H01Q 3/26 |
| WO | WO-2020167300 | A1 * | 8/2020 | H01Q 3/267 |
| WO | WO-2020192979 | A1 * | 10/2020 | H01Q 1/38 |
| WO | WO-2021056642 | A1 * | 4/2021 | H01Q 1/22 |
| WO | WO-2021085976 | A1 * | 5/2021 | H04B 7/0408 |
| WO | WO-2022222413 | A1 * | 10/2022 | H04L 27/04 |

(56) References Cited

FOREIGN PATENT DOCUMENTS

| WO | WO-2024061090 A1 * | 3/2024 | ............... H04B 1/30 |
| WO | WO-2024110018 A1 * | 5/2024 | ............ H01Q 3/267 |

OTHER PUBLICATIONS

International Search Report And Written Opinion dated Dec. 7, 2023 received in PCT Patent Application No. PCT/CN2023/118722.

Qian et al.; "A 4-Element Digital Modulated Polar Phased-Array Transmitter With Phase Modulation Phase-Shifting", Article in IEEE Journal of Solid-State Circuits, vol. 56, No. 11, Nov. 2021, 17 pages.

Salarpour et al.; "Synchronization-Phase Alignment Of All-Digital Phase-Locked Loop Chips For A 60-GHz MIMO Transmitter And Evaluation Of Phase Noise Effects",Article in IEEE Transactions on Microwave Theory and Techniques, vol. 67, No. 7, Jul. 2019,13 pages.

Antonov et al.; "A Delay-Based LO Phase-Shifting Generator For A 2-5GHz Beamsteering Receiver In 28nm CMOS",4 pages.

Shahramian et al.; "A Fully Integrated 384-Element, 16-Tile, W-Band Phased Array With Self-Alignment And Self-Test", Article in IEEE Journal of Solid-State Circuits, 16 pages.

Pang et al.; "A 28-GHz CMOS Phased Array Transceiver Based On LO Phase-Shifting Architecture With Gain Invariant Phase Tuning For 5G New Radio",Article in IEEE Journal of Solid-State Circuits—Mar. 2019,16 pages https://www.researchgate.net/publication/331602131.

Aoki et al.;"Asynchronous 256-Element Phased-Array Calibration for 5G Base Station", Article in IEEE Microwave and Wireless Components Letters, vol. 31, No. 6, Jun. 2021, 4 pages.

Aumann et al.;"Phased Array Antenna Calibration and Pattern Prediction Using Mutual Coupling Measurements", Article in IEEE Transactions on Antennas and Propagation, vol. 37, No. 7, Jul. 1989, 7 pages.

Inac et al.;"A Phased Array RFIC with Built-In Self-Test Using an Integrated Vector Signal Analyzer", 3 pages.

Inac et al.;"A 90100-GHz Phased-Array Transmit Receive Silicon RFIC Module With Built-In Self-Test", Article in IEEE Transactions on Microwave Theory and Techniques, vol. 61, No. 10, Oct. 2013,9 pages.

\* cited by examiner

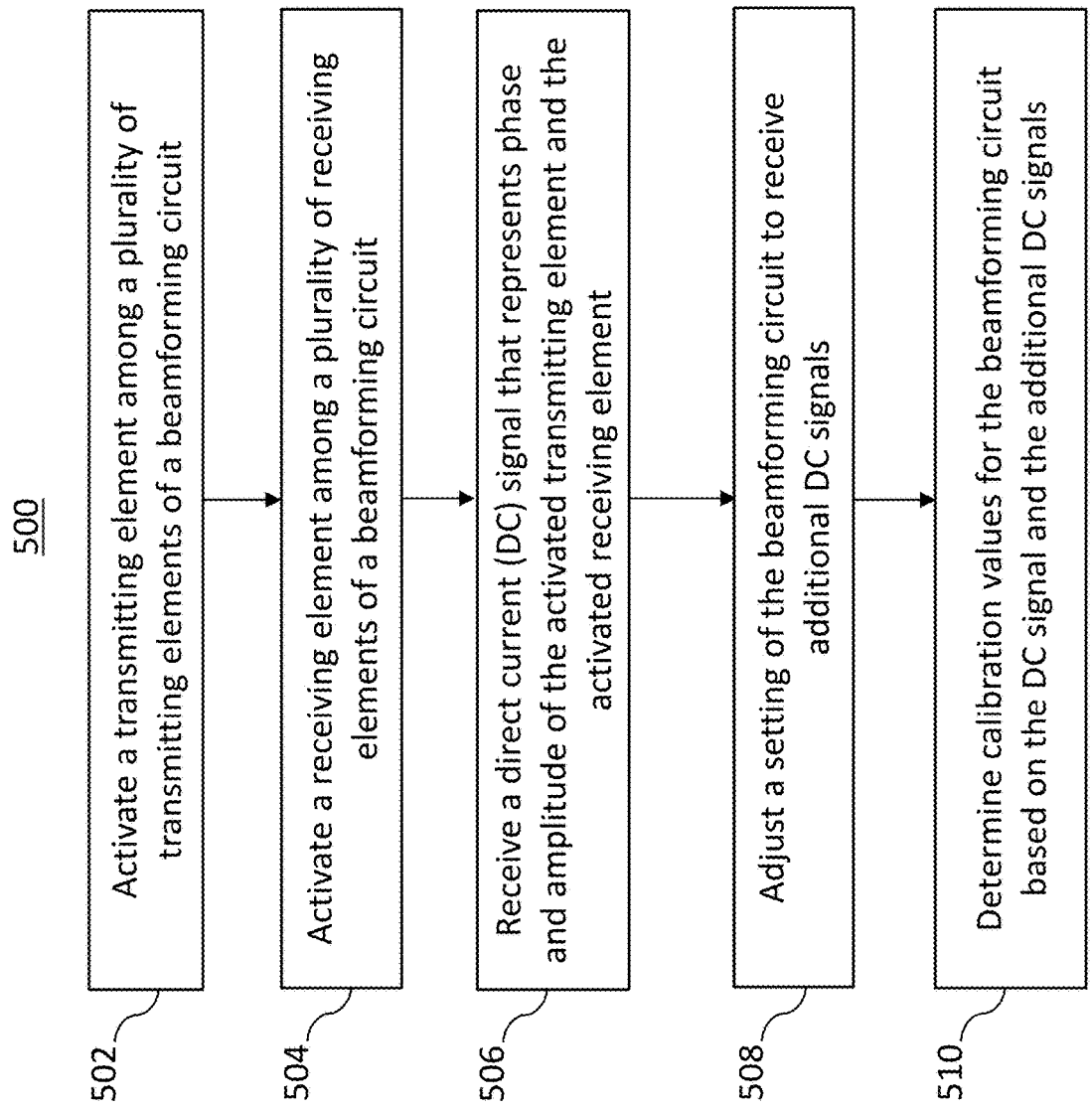

AMPLITUDE AND PHASE ALIGNMENT OF PHASED ARRAY ELEMENTS

FIELD

The present application relates to antennas, phased arrays, beamforming, integrated circuits and programs, and to computer-implemented methods and systems relating to amplitude and phase alignment of phased array elements.

BACKGROUND

A phased array system may include a beamforming integrated circuit (IC) and a plurality of antennas. The phased array system may use a plurality of antenna signal paths, where each antenna signal path may have a variable time delay. For phase array systems being implemented as receivers (or receiver channels in a transceiver), the beamforming circuit may use propagation delay produced by the variable time delay in each antenna signal path of signals being received by the phased array so that higher receiver gain is achieved for signals arriving from a specific direction. For phase array systems being implemented as transmitters (or transmission channels in a transceiver), the beamforming circuit may control time delay difference between successive antenna signal paths of the plurality of antennas to generate an electromagnetic beam having specific direction. The beamforming IC may use the changes in the time delay difference to steer the electromagnetic beam to different directions.

SUMMARY

In one embodiment, a method for operating a beamforming circuit is generally described. The method can include activating a transmitting element among a plurality of transmitting elements of a beamforming circuit. The method can further include activating a receiving element among a plurality of receiving elements of a beamforming circuit. The method can further include receiving a direct current (DC) signal that represents phase and amplitude of the activated transmitting element and the activated receiving element. The method can further include adjusting a setting of the beamforming circuit to receive additional DC signals that represent phases and amplitudes of the activated transmitting element and the activated receiving element under the adjusted setting. The method can further include determining calibration values for the beamforming circuit based on the DC signal and the additional DC signals. The method can align the gain and/or phase of different antennas in a phased array without performing relatively complex signal processing techniques or in-field measurements.

In one embodiment, receiving the DC signal and the additional DC signals can include receiving the DC signal and the additional DC signals from a mixer configured to mix an input of the activated transmitting element and an output of the activated receiving element to generate the DC signal and the additional DC signals. Utilization of the mixer in the method can avoid usage of hardware components such as high sampling rate analog-to-digital converters (ADC) and digital signal processors (DSP).

In one embodiment, adjusting the setting of the beamforming circuit can include sweeping a phase shifter in at least one selected from the group consisting of the activated transmitting element and the activated receiving element. In response to the sweeping, the DC signal and the additional DC signals can form a function of a combined phase of the activated transmitting element and the activated receiving element, a combined gain of the activated transmitting element and the activated receiving element and the adjusted settings. The sweeping of phase shifter can leverage circuits in a phased array system including the beamforming circuit, and can produce different DC signals, where variations in the different DC signals can enable relatively low complexity calibration.

In one embodiment, the sweeping can include sweeping a phase shifter of the activated receiving element. The phase sweeping of phase shifter can leverage circuits in a phased array system including the beamforming circuit, and can produce different DC signals, where variations in the different DC signals can enable relatively low complexity calibration.

In one embodiment, the method can further include storing the DC signal and the additional DC signals in a memory. The stored DC signals can be used for aligning the gain and/or phase of different antennas in a phased array without performing relatively complex signal processing techniques or in-field measurements.

In one embodiment, the activated transmitting element can be a first transmitting element, the activated receiving element can be a first receiving element, the DC signal can be a first DC signal, and the additional DC signals can be first additional DC signals. The method can further include in response to receiving the first DC signal and the first additional DC signals, storing the first DC signal in a memory. The method can further include, in response to storing the first DC signal and the first additional DC signals, deactivating the first transmitting element and the first receiving element. The method can further include activating a second transmitting element among the plurality of transmitting elements. The method can further include activating a second receiving element among the plurality of receiving elements. The method can further include receiving a second DC signal that represents phase and amplitude of the second transmitting element and the second receiving element. The method can further include adjusting the setting of the beamforming circuit to receive second additional DC signals that represent phase and amplitude of the second transmitting element and the second receiving element under the adjusted setting. The method can further include determining the calibration values for the beamforming circuit based on the first DC signal, the first additional DC signals, the second DC signal, and the second additional DC signals. The additional DC signals can be used for aligning the gain and/or phase of different antennas in a phased array without performing relatively complex signal processing techniques or in-field measurements.

In one embodiment, the DC signal and the additional DC signals can form a function of a combined phase of the activated transmitting element and the activated receiving element, a combined gain of the activated transmitting element and the activated receiving element and the adjusted settings. Determining the calibration values can include determining the calibration values based on at least one selected from the group consisting of extracted parameters of the function, a maximum of the function, a minimum of the function, and a zero crossing point of the function. Utilization of features in the sinusoidal function can avoid performing relatively complex signal processing techniques or in-field measurements.

In one embodiment, determining the calibration values can include determining the calibration values to calibrate a gain setting of the beamforming circuit based on the maximum and the minimum of the function, and determining the calibration values to calibrate a phase setting of the beamforming circuit based on the zero crossing point of the sinusoidal function. Utilization of features in the function can avoid performing relatively complex signal processing techniques or in-field measurements.

In one embodiment, the activated transmitting element can be in a first tile of a multi-tile phased array. The activated receiving element can be in a second tile of a multi-tile phased array. The DC signal can be received from a down-converter mixer of the activated receiving element. The method can be implemented for calibrating various types of mismatches or imbalance in phased arrays including multi-tile phased arrays.

In one embodiment, an apparatus for operating a phased array is generally described. The apparatus can include a plurality of transmitting elements, a plurality of receiving elements, and a mixer. The mixer can be configured to, in response to being connected to a transmitting element among the plurality of transmitting element and a receiving element among the plurality of receiving element, generate a DC signal that represents phase and amplitude of the activated transmitting element and the activated receiving element. The mixer can be further configured to output the DC signal to a processor to determine calibration values for the apparatus based on the DC signal. In response to adjustments to a phase shifter in one of the transmitting element and the receiving element, the mixer can output additional DC signals that represent phases and amplitudes of the transmitting element and the receiving element under the adjustments to the phase shifter. The apparatus can align the gain and/or phase of different antennas in a phased array without performing relatively complex signal processing techniques or in-field measurements.

In one embodiment, the mixer can be configured to mix an input of the transmitting element and an output of the receiving element to generate the DC signal. Utilization of the mixer can avoid usage of hardware components such as high sampling rate analog-to-digital converters (ADC) and digital signal processors (DSP).

In one embodiment, the adjustments to the phase shifter can be a sweep of a phase shifter in at least one selected from the group consisting of the transmitting element and the receiving element. The phase sweeping of phase shifter can leverage circuits in a phased array system including the beamforming circuit, and can produce different DC signals, where variations in the different DC signals can enable relatively low complexity calibration.

In one embodiment, the transmitting element can be a first transmitting element, the receiving element is a first receiving element, the DC signal is a first DC signal, and the additional DC signals are first additional DC signals. The mixer can be further configured to, in response to being disconnected from the first transmitting element and the first receiving element. The mixer can be further configured to, in response to being connected to a second transmitting element and a second receiving element, generate a second DC signal that represents phase and amplitude of the second transmitting element and the second receiving element. The mixer can be further configured to, in response to the adjustments to another phase shifter in one of the second transmitting element and the second receiving element, output second additional DC signals that represent phases and amplitudes of the second transmitting element and the second receiving element under the adjustments to said another phase shifter. The mixer can be further configured to output the second DC signal and second additional DC signals to the processor. The additional DC signals can be used for aligning the gain and/or phase of different antennas in a phased array without performing relatively complex signal processing techniques or in-field measurements.

In one embodiment, the transmitting element can be in a first tile of a multi-tile phased array. The receiving element can be in a second tile of a multi-tile phased array. The mixer can be a down-converter mixer of the activated receiving element. The method can be implemented for calibrating various types of mismatches or imbalance in phased arrays including multi-tile phased arrays.

In one embodiment, a system for operating a phased array is generally described. The system can include a beamforming circuit including a plurality of transmitting elements and a plurality of receiving elements. The system can further include a mixer and at least one processor. The at least one processor can be configured to at least one processor configured to activate a transmitting element among the plurality of transmitting elements. The at least one processor can be further configured to activate a receiving element among the plurality of receiving elements. The mixer can be configured to mix an input of the activated transmitting element and an output of the activated receiving element to generate a DC signal that represents phase and amplitude of the activated transmitting element and the activated receiving element. The at least one processor can be configured to receive the DC signal from the mixer. The at least one processor can be configured to adjust a setting of the beamforming circuit to receive additional DC signals from the mixer. The additional DC signals can represent phases and amplitudes of the activated transmitting element and the activated receiving element under the adjusted setting. The at least one processor can be configured to determine calibration values for the beamforming circuit based on the DC signal and the additional DC signals. The system can align the gain and/or phase of different antennas in a phased array without performing relatively complex signal processing techniques or in-field measurements.

In one embodiment, the at least one processor can be configured to sweep a phase shifter. The phase shifter can be in one of the activated transmitting element and the activated receiving element. In response to the sweep, the DC signal and the additional DC signals can form a function of a combined phase of the activated transmitting element and the activated receiving element, a combined gain of the activated transmitting element and the activated receiving element and the adjusted settings. The sweeping of phase shifter can leverage circuits in a phased array system including the beamforming circuit, and can produce different DC signals, where variations in the different DC signals can enable relatively low complexity calibration.

In one embodiment, the activated transmitting element can be a first transmitting element, the activated receiving element can be a first receiving element, the DC signal can be a first DC signal, and the additional DC signals can be first additional DC signals. The at least one processor can be configured to, in response to receiving the first DC signal, store the first DC signal in a memory. The at least one processor can be configured to, in response to storing the first DC signal, deactivate the first transmitting element and the first receiving element. The at least one processor can be further configured to activate a second transmitting element among the plurality of transmitting elements. The at least one processor can be configured to activate a second receiving element among the plurality of receiving elements. The mixer can be configured to generate a second DC signal that represents phase and gain of the second transmitting element and the second receiving element. The at least one processor can be configured to receive the second DC signal from the mixer. The at least one processor can be configured to adjust a setting of the beamforming circuit to receive second additional DC signals from the mixer. The second additional DC signals can represent phases and amplitudes of the second transmitting element and the second receiving element under the adjusted setting. The at least one processor can be configured to determine the calibration values for the beamforming circuit based on the first DC signal, the first additional DC signals, the second DC signal, and the second additional DC signals. The additional DC signals can be used for aligning the gain and/or phase of different antennas in a phased array without performing relatively complex signal processing techniques or in-field measurements.

In one embodiment, the DC signal and the additional DC signals can form a function of a combined phase of the activated transmitting element and the activated receiving element, a combined gain of the activated transmitting element and the activated receiving element and the adjusted settings. The at least one processor can be configured to determine the calibration values based on at least one selected from the group consisting of extracted parameters of the function, a maximum of the function, a minimum of the function, and a zero crossing point of the function. Utilization of features in the sinusoidal function can avoid performing relatively complex signal processing techniques or in-field measurements.

In one embodiment, the at least one processor can be configured to determine the calibration values to calibrate a gain setting of the beamforming circuit based on the maximum and the minimum of the function, and determine the calibration values to calibrate a phase setting of the beamforming circuit based on the zero crossing point of the sinusoidal function. Utilization of features in the function can avoid performing relatively complex signal processing techniques or in-field measurements.

In one embodiment, the activated transmitting element can be in a first tile of a multi-tile phased array, the activated receiving element can be in a second tile of a multi-tile phased array, and the mixer can be a down-converter mixer of the activated receiving element. The system can be implemented for calibrating various types of mismatches or imbalance in phased arrays including multi-tile phased arrays.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 5 illustrates a flow diagram relating to amplitude and phase alignment of phased array elements in one embodiment.

DETAILED DESCRIPTION

In an aspect, variation between gain and/or phase in the signal paths corresponding to two antennas can produce different amplitude and/or phase in the signal radiated by the antennas. Hence, having same or substantially same gain and phase across an array of antennas can be advantageous for the array of antennas to transmit the same signal. Gain and/or phase calibration can be performed to align the antennas in terms of amplitude and/or phase, respectively. The gain and/or phase alignment can reduce variation among different antennas. The systems (e.g., system 100 in FIG. 1) and methods described herein can align the gain and/or phase of different antennas without performing relatively complex signal processing techniques. In response to the alignment, the phased array can form transmit or receive beams in a predictable manner by applying the corresponding phase or time delays to each antenna.

Figure 1A:
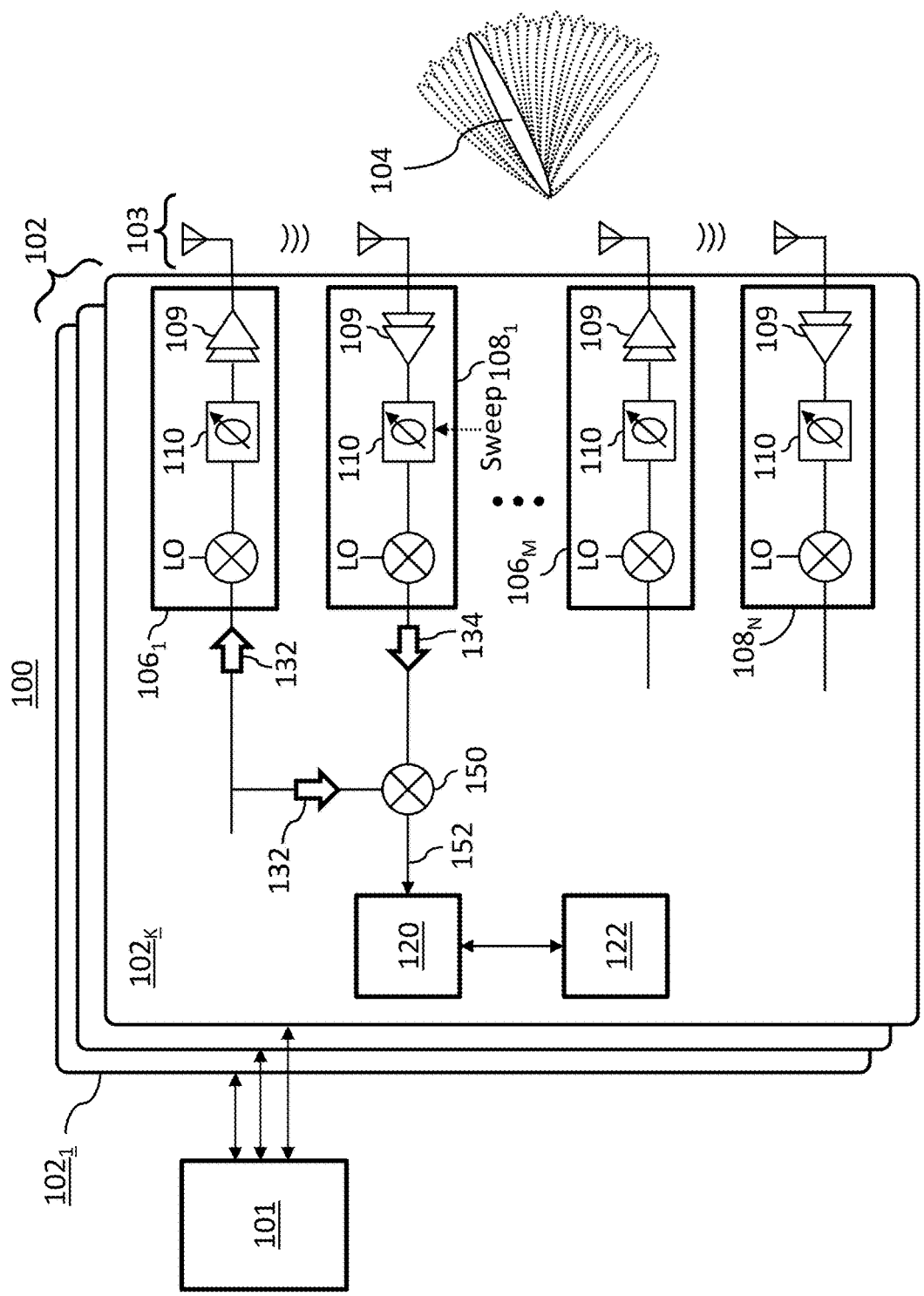
FIG. 1A illustrates an example system that can implement amplitude and phase alignment of phased array elements in one embodiment.

FIG. 1A illustrates an example system that can implement amplitude and phase alignment of phased array elements in one embodiment. System 100 can be a radio frequency (RF) system implemented by a communication device, such as a RF transmitter, a RF receiver, or a RF transceiver. System 100 can be configured to operate at common wireless radio frequencies, millimeter-wave frequencies, microwave frequencies, and/or other frequencies. System 100 can be a part of a wireless communication network, such as fourth generation (4G) wireless communications system, fifth generation (5G) wireless communications system, satellite communication system, point-to-point communications systems such as common data link, and/or other types of wireless communication networks.

System 100 can include a circuit 101, one or more beamforming integrated circuits (ICs) 102, a plurality of antennas 103, an processing element 120, and a mixer 150. Beamforming ICs 102 and the plurality of antennas 103 may form a phased array system. The plurality of antennas 103 can include a plurality of individual antennas and/or antenna arrays having different number of antennas. Each antenna among the antennas 103 may output a RF signal having a respective amplitude and phase. System 100 can include K beamforming ICs 102 (e.g., $102_1, \ldots, 102_K$), which can be identical to one another. In FIG. 1A, using beamforming IC $102_K$ as an example, each beamforming IC 102 can include a processing element 120, mixer 150, a memory device 122, a plurality of transmitting elements 106 (e.g., M transmitting elements $106_1, \ldots, 106_M$), and a plurality of receiving elements 108 (e.g., N receiving elements $108_1, \ldots, 108_N$). In one or more embodiments, beamforming ICs 102 can include elements (e.g., tiles), where each element can include one transmitting element 106 and one receiving element 108 and each element can be switched to perform transmission or receiving functions. Memory device 122 can include volatile memory, non-volatile memory, registers, and/or other types of storage devices that can store data relating to operations of system 100.

Figure 1B:
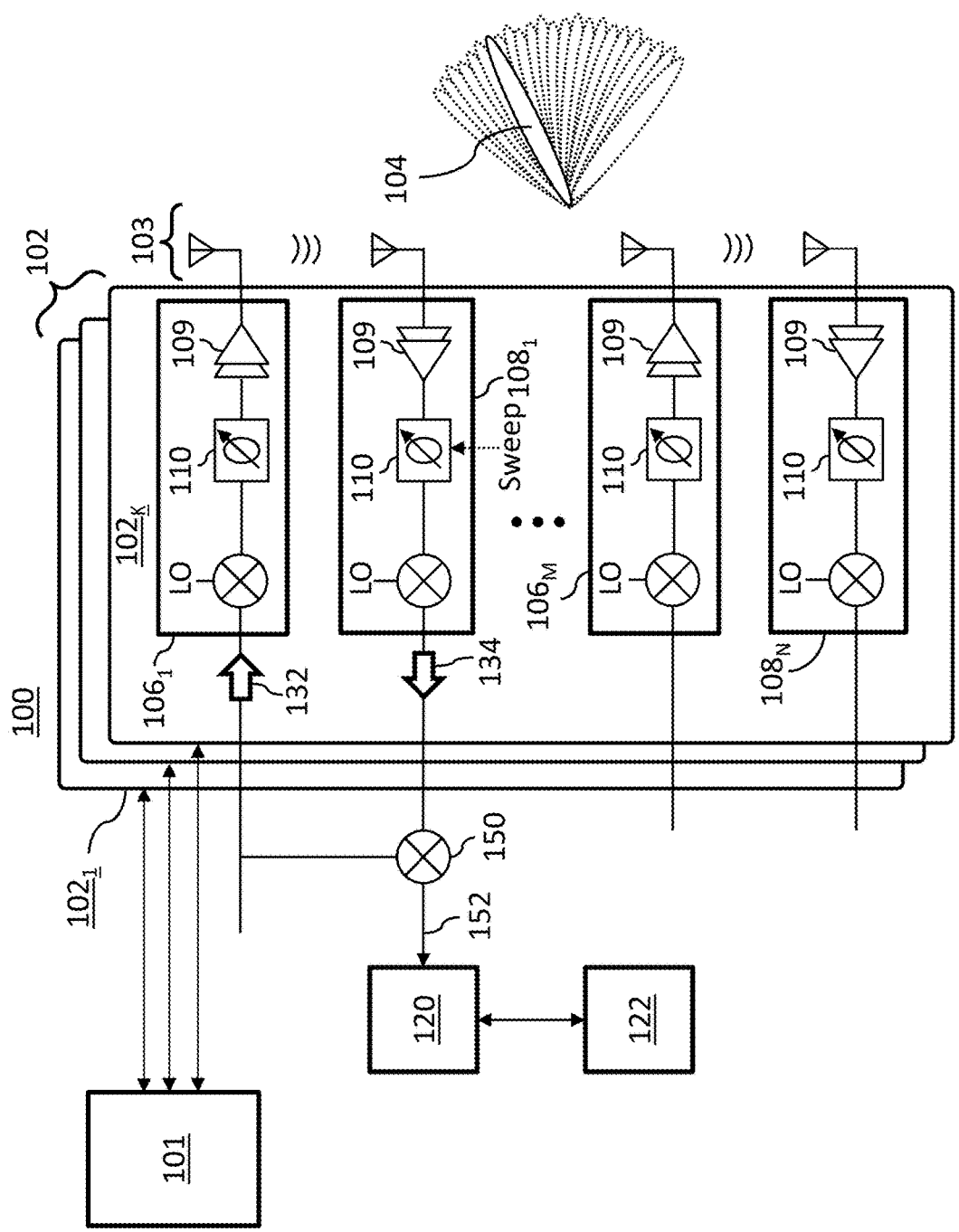
FIG. 1B illustrates another example system that can implement amplitude and phase alignment of phased array elements in one embodiment.
Figure 1C:
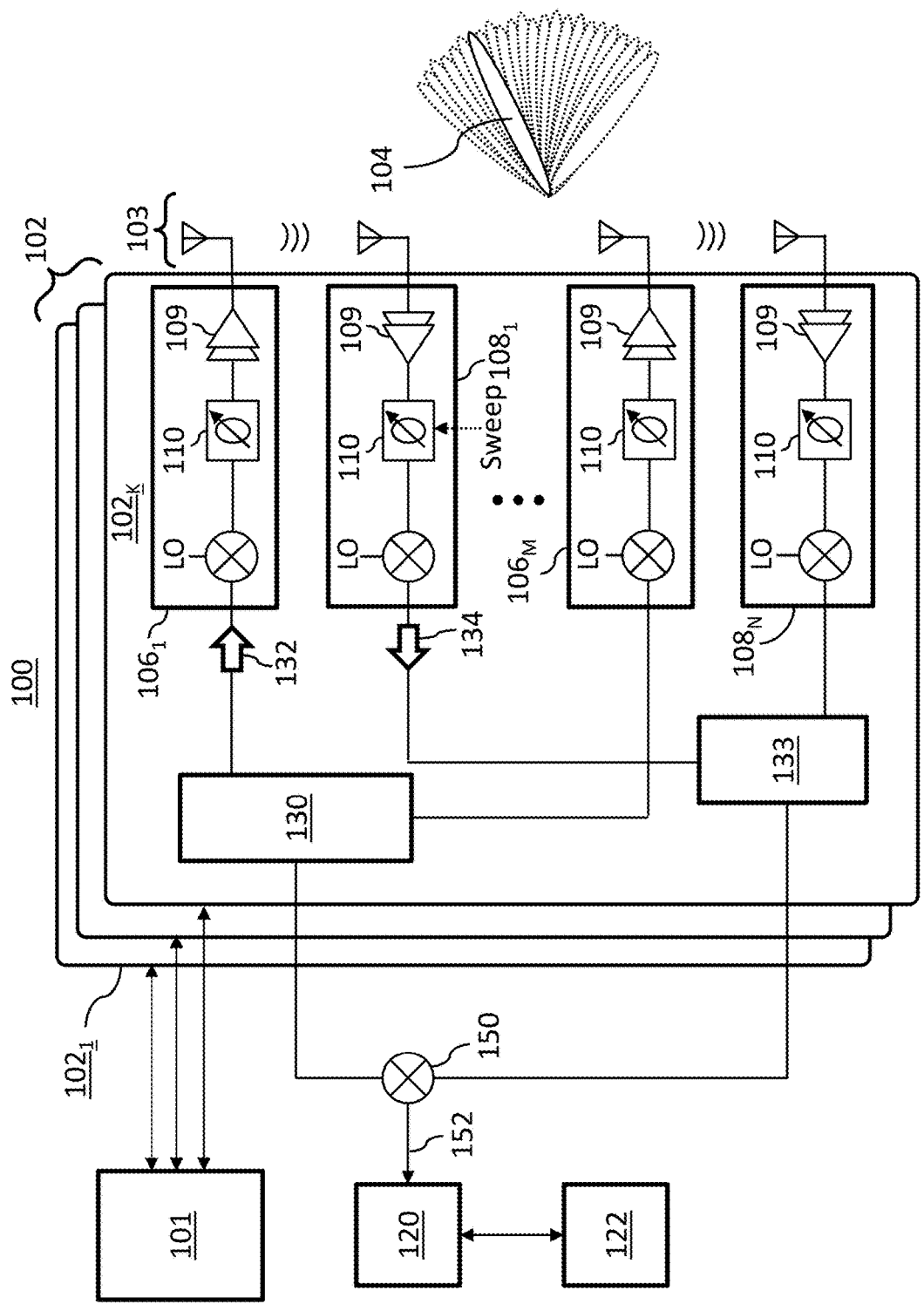
FIG. 1C illustrates another example system that can implement amplitude and phase alignment of phased array elements in one embodiment.

In another embodiment shown in FIG. 1B, processing element 120, memory device 122, and mixer 150 can be standalone devices external to beamforming ICs 102. In one embodiment, processing element 120 can be a standalone processing device such as a field-programmable-gate-array (FPGA) device or a state machine. In other embodiments, processing element 120 can be a software running on a general purpose computer platform that interacts with the beamforming ICs 102. In one or more embodiments, processing element 120 can include an analog-to-digital converter (ADC) to process direct current (DC) signals. In one or more embodiments, processing element 120 can be connected to an ADC, that is external to processing element 120, that can process DC signals. Each transmitting element 106 and receiving element 108 can include a respective set of components, such as a gain control circuit 109, a phase shifter 110, one or more mixers, such as a mixer 150, for combining a RF signal with a local oscillator (LO) signal. In another embodiment shown in FIG. 1C, processing element 120, memory device 122, and mixer 150 can be standalone devices external to beamforming ICs 102, and mixer 150 can be connected to a splitter 130 and a combiner 133 of beamforming IC 102. Splitter 130 can be connected to transmitting elements 106 to route signals to transmitting elements 106. Combiner 133 can be connected to receiving elements 108 to combine signals from receiving elements 108. In some embodiments, multiple transmitting elements can be grouped together and activated together, and similarly, multiple receiving elements can be grouped together and activated together. Mixer 150 can process the combined signal passing through the multiple activated transmitting elements and the multiple activated receiving elements and the corresponding antennas.

Circuit 101 can be a part of a RF communication device such as a radio frequency (RF) transmitter, a RF receiver, a transmission channel of a RF transceiver, or a receiver channel of a RF transceiver. In one embodiment, circuit 101 can include a baseband processor, mixer circuits such as up-down converters, filters, memory devices, local oscillators, digital-to-analog converters (DAC) (if circuit 101 is a RF transmitter, or a transmission channel of a RF transceiver), analog-to-digital converters (ADC) (if circuit 101 is a RF receiver, or a receiver channel of a RF transceiver), signal generators, microcontrollers, and/or other types of components or integrated circuits that belong to a RF communication device. Circuit 101 can be configured to output RF signals, such as an RF signal 132, to transmitting elements 106 when system 100 is intended to operate as a transmitter. In examples where circuit 101 is part of a RF transceiver or receiver, circuit 101 can also be configured to receive RF signals, such as an RF signal 134, from receiving elements 108 of beamforming ICs 102. The RF signals being exchanged between circuit 101 and beamforming ICs 102 can be radio-frequency, millimeter-wave frequency, microwave frequency, and/or signals of other frequencies that can carry information or data.

A phase shift control setting may be inputted to each phase shifter 110 to control the phase of a RF signal being outputted by, or being received by, antennas 103. A gain control setting may be inputted to each gain control circuit 109 to control the gain of a RF signal being outputted by, or being received by, antennas 103. In some embodiment, phase shifter 110 can be implemented in software, FPGA, and/or another processor. In one or more embodiments, phase shifter 110 can be implemented on one or more of a local oscillator (LO) path, an RF path and an intermediate frequency (IF) path of beamforming ICs 102. The embodiments described going forward assume an RF phase shifter. To transmit RF signals, beam steering can be implemented by adjusting the phase shifter 110 in transmitting elements 106. The phase delays across transmitting elements 106 can produce an interference pattern that can focus a beam 104 in a specific direction. Beam 104 can have a field pattern and beam direction that can be based on the gain and phase parameters being set in front-end circuits of beamforming ICs 102. To receive RF signals, the phase delays across receiving elements 108 can cause the received RF signals to combine coherently when they arrive at the antennas 103 from a specific direction, forming a receiver beam in the specific direction. The receiver beam can have a field pattern and beam direction that can be based on the gain and phase parameters being set in receiving elements 108.

Mixer 150 can be configured to receive two input signals and generate an output signal having new frequency components. In one embodiment, system 100 can be operating in a calibration mode, and two input signals that can be inputted to mixer 150 can be 1) RF signal 132 that is being inputted to transmitting element $106_1$, and 2) RF signal 134 from receiving element $108_1$. Under calibration mode, RF signal 132 can be a test signal being applied from circuit 101 to the input of the activated transmitting element $106_1$. RF signals 132, 134 can be sinusoidal with the same frequency. In one embodiment, an output of the activated transmitting element and an input of the activated receiving element may not be perfectly isolated, thus enabling the coupling of signals between them. In response to receiving RF signals 132, 134 as inputs, mixer 150 can generate an output signal 152. In one embodiment, output signal 152 can be a direct current (DC) output or DC signal that represents or captures combination of the phase and gain of the activated transmitting and the receiving elements (e.g., transmitting element $106_1$ and receiving element $108_1$). In one embodiment, the DC output can be a value indicative of a combination of path gains and phases of the activated transmitting element $106_1$ and receiving element $108_1$, as well as the gain and phase of wireless coupling between antennas connected to the activated transmitting and receiving elements, under a specific phase setting of phase shifter 110 in at least one of the activated transmitting and receiving elements. As phase settings of the activated transmitting and/or receiving element change, signal 152 can also change and the variation of signal 152 can represent or capture phase and gain variation of the activated transmitting and receiving elements. In one embodiment, mixer 150 can be implemented in hardware such as an analog circuit. In another embodiment, mixer 150 can be implemented as software, FPGA, and/or another processor, by processing in-phase and quadrature data or RF data.

In one embodiment, output signals from mixer 150, including output signal 152, can be used for a determination of calibration values or parameters that can be used for calibrating gain and/or phase settings of transmitting elements 106 and receiving elements 108 of beamforming ICs 102. In an aspect, the calibration values can provide settings that cause the gain and/or phase of the transmitting elements and the receiving elements to be precise (e.g., with minimized error) or deterministic. For example, when the phased array is used to create beam that point in their broadside, the calibration mode of system 100 can align the gain and/or phase of different antennas in a phased array without performing relatively complex signal processing techniques or in-field measurements. In another example, when the phased array is used to create a beam with a specified shape, calibration described herein can ensure that the gain and/or phase of each antenna in a phased array is precisely the value specified, and this can be achieved with relatively simple signal processing techniques and in-field measurements. In one embodiment, processing element 120 can be configured to perform a sweep of phase shifters 110 in transmitting elements 106 and/or receiving elements 108. The sweep can include, for example, setting a phase shifter to a plurality of different phase settings within a predefined amount of time. In response to a transmitting element and a receiving element being activated, the sweep performed by processing element 120 can cause mixer 150 to output one or more DC signals (e.g., DC output) that can form a sinusoidal function of the phase and amplitude (or gain) variation of the activated transmitting and receiving elements. In an aspect, if phase shifter 110 is configured to a specific phase setting, the output of mixer 150 can be a constant value. The sweeping performed by processing element 120 allows mixer 150 to provide different values that vary with phase settings, and the varying values form a DC output (or a collection of DC outputs) having a sinusoidal waveform. In one embodiment, the DC outputs can form the sinusoidal function in response to the phase shifter that was swept being a calibrated phase shifter (e.g., an ideal phase shifter that has no gain non-idealities or phase non-idealities). In one embodiment, if the phase shifter is non-ideal, or uncalibrated, a separate compensation of the non-idealities result in a sinusoidal waveform. Further, the amplitude of the sinusoid waveform can be a function of the gain of transmitting elements 106 and receiving elements 108. In one embodiment, the peak-to-peak (e.g., max minus min) of the sinusoid waveform can be proportional to the total gain of the transmitting path of the activated transmitting element, the receiving path of the activated receiving element, and the coupling gain between the antennas connected to the activated transmitting and receiving elements. Further, a phase setting that results in the zero crossing of the sinusoid can be indicative of the total phase of the transmitting path of the activated transmitting element, the receiving path of the activated receiving element, and the coupling gain between the antennas connected to the activated transmitting and receiving elements. In one embodiment, for a given set of settings or variables (e.g., N types or combinations of gain and/or phase settings), the function can be a multi-dimensional function including coefficients and parameters, where the coefficients and parameters can represent fitting parameters (e.g., gain and/or phase settings) for the N types of settings, as well as the gain and phase variations within the elements. A solution to this multi-dimensional function, under specific objectives and/or constraints (e.g., a targeted precision for a specific beam shape and direction), can generate a set of fitting parameters that can be used for determining calibration values. For example, a solution to a sinusoidal function formed by DC outputs of mixer 150 can extract features such as the minimum, the maximum, and the zero-crossing point of the sinusoidal function, and these extracted features to determine calibration values.

In response to obtaining the DC output indicating phase and gain variations between the activated transmitting and receiving elements, processing element 120 can deactivate the activated transmitting and receiving elements and activate a new set or pair of transmitting element and receiving element. Processing element 120 can perform the sweep for the new set of transmitting and receiving elements to measure another DC output from mixer 150 indicating phase and gain variations between the new set of transmitting and receiving elements. Processing element 120 can continue the sweep for every pair of transmitting and receiving element in beamforming ICs 102 and store the DC outputs in a memory device of beamforming ICs 102. In one embodiment, to activate a pair of elements including one transmitting element and one receiving element, processing element 120 can switch or select connections in splitter 130 and/or combiner 133 of beamforming IC 102 to connect the pair of elements to mixer 150 (e.g., deselected elements can be disconnected from mixer 150). In embodiments where splitter 130 and combiner 133 are passive devices, activating individual transmitting and receiving elements can be sufficient to connect the activated elements to mixer 150. To deactivate the pair of elements including one transmitting element and one receiving element, processing element 120 can disconnect mixer 150 from the pair of elements that are activated. Hence, splitters and/or combiners embedded in beamforming IC 102 can be leveraged.

In response to storing DC outputs indicating phase and gain variations for every pair of transmitting and receiving elements in beamforming ICs 102, processing element 120 can perform one or more calculations on the stored phase and gain variations to determine imbalance (e.g., gain and/or phase differences or imbalance) between transmitting elements and/or imbalance between receiving elements of beamforming ICs 102. Processing element 120 can determine calibration values to calibrate gain (or amplitude) and/or phase settings for transmitting elements 106, and gain (or amplitude) and/or phase settings for receiving elements 108 in beamforming ICs 102. The calibration can address imbalances among transmitting elements 106, and imbalances among receiving elements 108, in beamforming ICs 102. In an aspect, the resulting phase and amplitude mismatch in each element of the phased array can occur due to variations in the intermediate frequency (IF) circuits and signal distributions, or the local oscillator (LO) circuits and signal distribution, or radio frequency (RF) circuits signal distribution. In some embodiments, mixer 150 can be integrated in a specific location among system 100 such that these different types of variations can be calibrated. In one or more embodiments, one or more types of variations among these variations can be calibrated. In one or more embodiments, processing element 120 can use specific features of the sinusoidal functions of the stored phase and gain variations, such as maximum values, minimum values, zero crossing values, or other features, to determine the calibration values. In one embodiment, processing element 120 can determine calibration values to calibrate a gain setting of gain control circuits 109 in beamforming ICs 102 based on the maximum and the minimum of the sinusoidal function. Processor element 120 can further determine the calibration values to calibrate a phase setting of phase shifters 110 of beamforming ICs 102 based on the zero crossing point of the sinusoidal function.

Figure 2A:
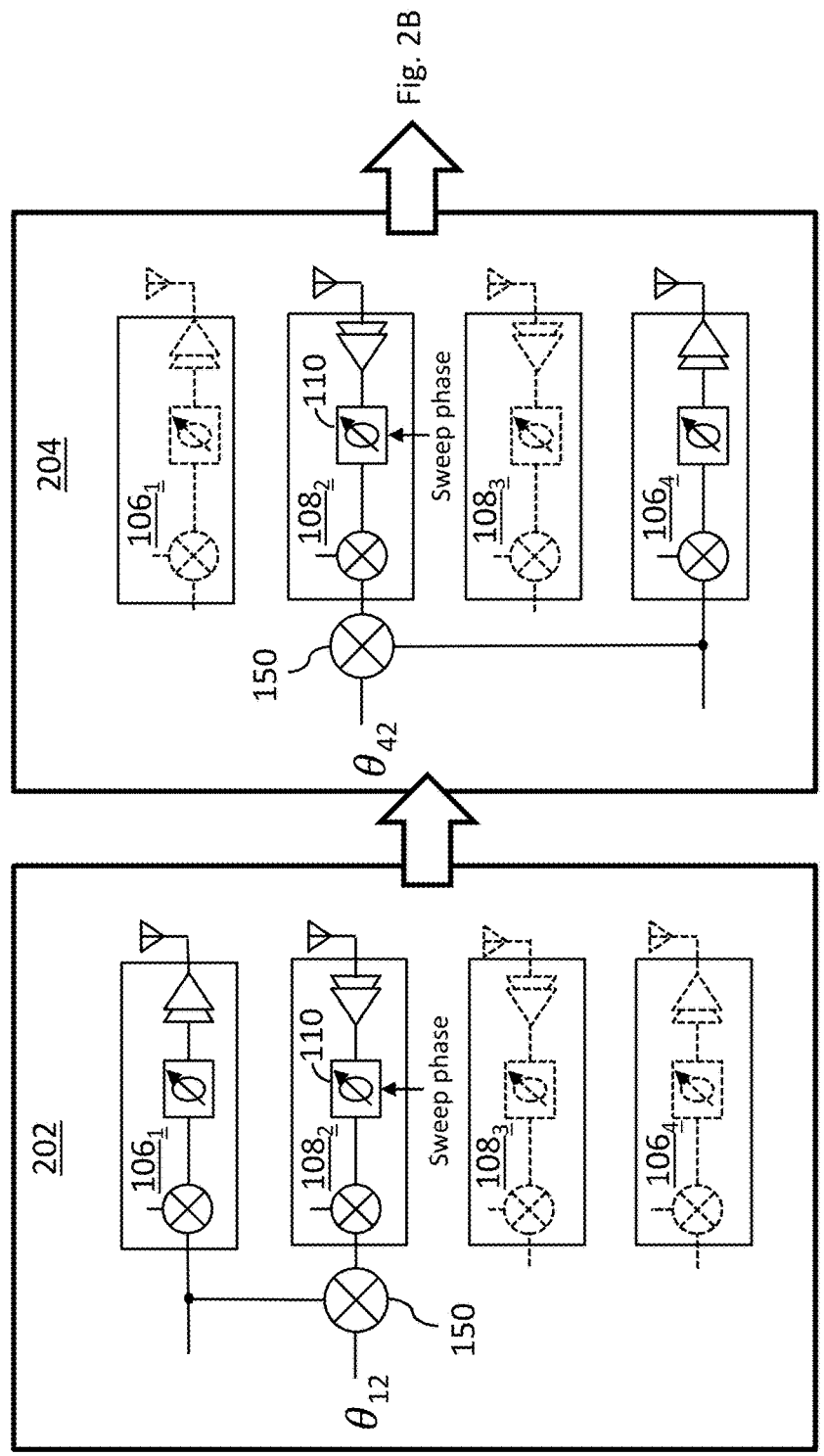
FIG. 2A illustrates a process for amplitude and phase alignment of phased array elements in one embodiment.
Figure 2B:
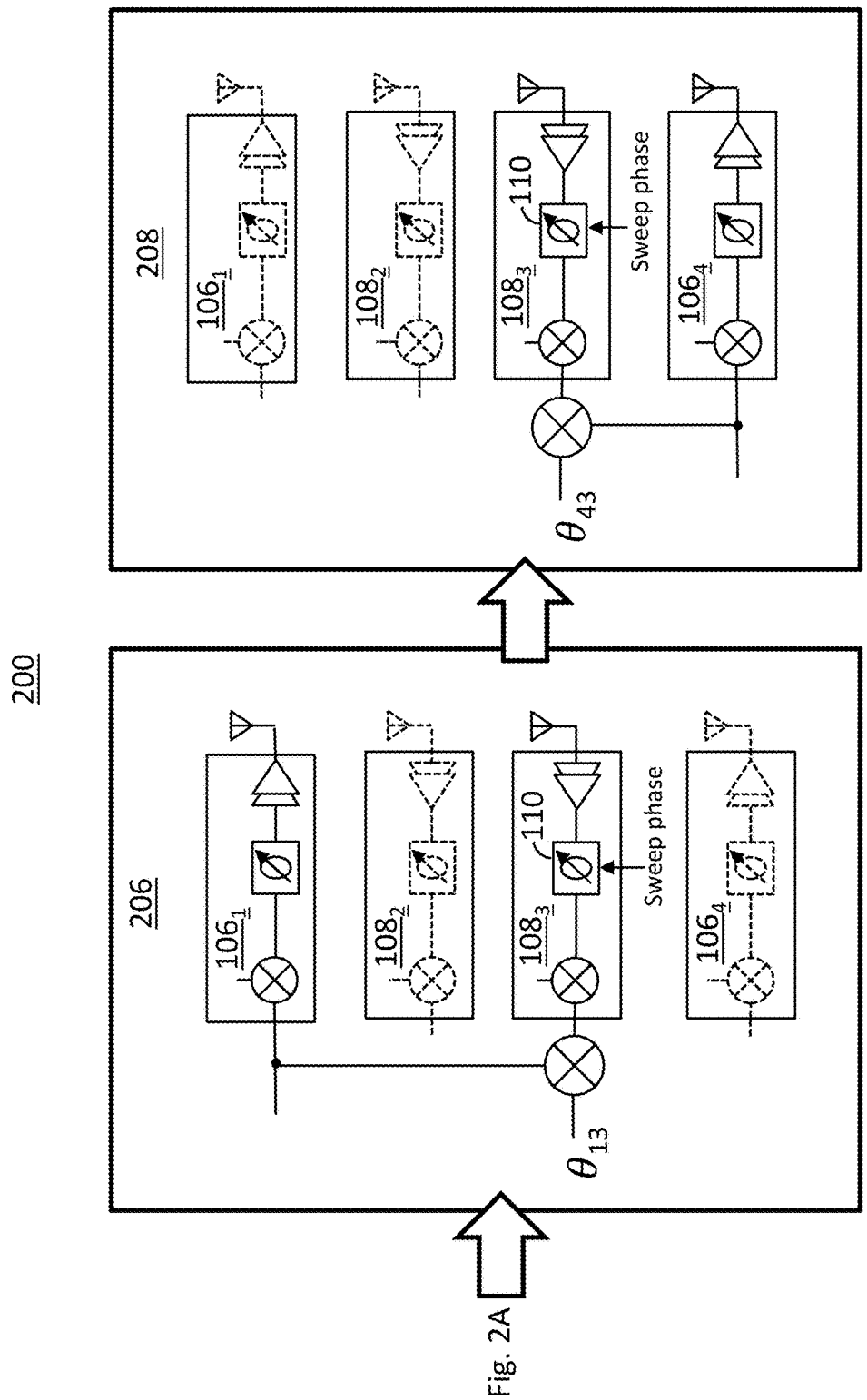
FIG. 2B illustrates a continuation of the process of FIG. 2A in one embodiment.

FIG. 2A and FIG. 2B illustrate a process 200 for amplitude and phase alignment of phased array elements in one embodiment. Process 200 can be performed by processing element 120 (see FIG. 1) to obtain a plurality of DC outputs indicating phase and gain variations between pairs of transmitting and receiving elements of beamforming ICs 102 in FIG. 1. In an iteration 202 of process 200, processing element 120 can activate connections between mixer 150 and transmitting element 106$_1$, receiving element 108$_2$. Mixer 150 can generate a series of output signals that can form a DC output having a sinusoidal waveform that represents or captures a phase variation $\theta_{12}$ between transmitting element 106$_1$ and receiving element 108$_2$. Processing element 120 can sweep a phase shifter 110 of receiving element 108₂ by adjusting a phase setting of phase shifter 110 of receiving element 108₂ for one or more iterations. In one embodiment, processing element 120 can sweep phase shifter 110 by adjusting the phase setting to a plurality of predefined values, or by randomly selecting phase settings within a predefined range of phases (e.g., from −90° to 90°, or the like). In one or more embodiments, a phase shifter in the LO path or in the IF path can undergo the sweeping such that the phase of the transmitting element or the phase of the receiving element changes. Processing element 120 can store the DC output representing $\theta_{12}$ in a memory device of a corresponding beamforming IC 102, and the stored DC output representing $\theta_{12}$ can be associated or mapped to transmitting element 106₁ and receiving element 108₂ in the memory device. Processing element 120 can use the stored DC output representing $\theta_{12}$ to determine calibration values for transmitting element 106₁ and receiving element 108₂. For example, $\theta_{12}$ could be the zero crossing value (or the phase shifter setting resulting in the zero crossing of the sinusoid) of the mixer 150. Further, the maximum and minimum values (herein $g_{12,min-max}$) of the sinusoid can be stored in processing element 120 to represent or capture the amplitude.

In response to processing element 120 storing the DC outputs representing $\theta_{12}$ and $g_{12,min-max}$, process 200 can proceed to iteration 204, where processing element 120 can deactivate connections between mixer 150 and transmitting element 106₁, receiving element 108₂, and activate connections between mixer 150 and transmitting element 106₄, receiving element 108₂. Mixer 150 can generate a series of output signals that can form a DC output having a sinusoidal waveform that represents or captures a phase variation $\theta_{42}$ between transmitting element 106₄ and receiving element 108₂. Processing element 120 can sweep a phase shifter 110 of receiving element 108₂ by adjusting a phase setting of phase shifter 110 of receiving element 108₂ for one or more iterations. For example, $\theta_{42}$ could be the phase shifter setting that results in the zero-crossing of the DC waveform. Processing element 120 can store the DC output representing $\theta_{42}$ in a memory device of a corresponding beamforming IC 102, and the stored DC output representing $\theta_{42}$ can be associated or mapped to transmitting element 106₄ and receiving element 108₂ in the memory device. Processing element 120 can use the stored DC output representing 842 to determine calibration values for transmitting element 106₄ and receiving element 108₂. The maximum and minimum values (herein $g_{42,min,max}$) of the sinusoid corresponding to DC output representing $\theta_{42}$ can also be stored.

In response to processing element 120 storing $\theta_{42}$, process 200 can proceed to iteration 206, where processing element 120 can deactivate connections between mixer 150 and transmitting element 106₄, receiving element 108₂, and activate connections between mixer 150 and transmitting element 106₁, receiving element 108₃. Mixer 150 can generate a series of output signals that can form a DC output having a sinusoidal waveform that represents a phase variation $\theta_{13}$ between transmitting element 106₁ and receiving element 108₃. Processing element 120 can sweep a phase shifter 110 of receiving element 108₃ by adjusting a phase setting of phase shifter 110 of receiving element 108₃ for one or more iterations. Processing element 120 can store the DC output representing $\theta_{13}$ in a memory device of a corresponding beamforming IC 102, and the stored DC output representing or capturing $\theta_{13}$ can be associated or mapped to transmitting element 106₁ and receiving element 108₃ in the memory device. Processing element 120 can use the stored DC output representing $\theta_{13}$ to determine calibration values for transmitting element 106₁ and receiving element 108₃. The maximum and minimum values (herein $g_{13,min,max}$) of the sinusoid corresponding to DC output representing $\theta_{13}$ can also be stored.

In response to processing element 120 storing $\theta_{13}$, process 200 can proceed to iteration 208, where processing element 120 can deactivate connections between mixer 150 and transmitting element 106₁, receiving element 108₃, and activate connections between mixer 150 and transmitting element 106₄, receiving element 108₃. Mixer 150 can generate a series of output signals that can form a DC output having a sinusoidal waveform that represents a phase variation $\theta_{43}$ between transmitting element 106₄ and receiving element 108₃. Processing element 120 can sweep a phase shifter 110 of receiving element 108₃ by adjusting a phase setting of phase shifter 110 of receiving element 108₃ for one or more iterations. Processing element 120 can store the DC output representing or capturing $\theta_{43}$ in a memory device of a corresponding beamforming IC 102, and the stored DC output representing $\theta_{43}$ can be associated or mapped to transmitting element 106₄ and receiving element 108₃ in the memory device. Processing element 120 can use the stored DC output representing $\theta_{43}$ to determine calibration values for transmitting element 106₄ and receiving element 108₃. The maximum and minimum values (herein $g_{43,min,max}$) of the sinusoid corresponding to DC output representing $\theta_{43}$ can also be stored.

Processing element 120 can continue to activate one transmitting element and one receiving element at a time, and for each activation, sweep a phase shifter of one of the activated transmitting element and activated receiving element to obtain a DC output from mixer 150. Processing element 120 can perform the iterative activation and sweeping for every pair of transmitting and receiving elements in beamforming ICs 102. The DC outputs obtained from the activation and sweeping can be stored and used for determination of calibration values. In one embodiment, processing element 120 can obtain DC outputs for every pair of transmitting element and receiving element, stored the DC outputs, and use the stored DC outputs to determine calibration values for beamforming ICs 102.

In another embodiment, processing element 120 can perform the sweep and obtain DC outputs for a specific set of transmitting and receiving elements, and determine the calibration values for the specific set of transmitting and receiving elements before moving on to sweep a next set of transmitting and receiving elements. For example, processing element 120 can perform the sweep and obtain DC outputs for two transmitting elements and two receiving elements (e.g., process 200) and determine the calibration values for the two transmitting elements and the two receiving elements before moving on to sweep a next set of transmitting and receiving elements. The number of elements in the set of transmitting and receiving elements can be arbitrary and dependent on a desired implementation of system 100. Further, sweeping a specific set of elements at one time can allow system to adaptively determine a number of elements to sweep instead of every element in beamforming ICs 102. For example, if imbalances among the transmitting elements, or imbalance among the receiving elements of beamforming ICs 102, fall below a predefined threshold after sweeping and calibrating X transmitting and receiving elements, then the system 100 can stop the sweeping until the imbalances exceeds the predefined threshold.

In one embodiment, processing element 120 can compile equations that describe relationships between one pair of elements (e.g., transmitting and/or receiving elements). For example, processing element 120 can sum DC outputs for different elements, remove common components in the sum, and remaining components can indicate imbalance between the different elements. Using FIG. 2A and FIG. 2B as an example, in response to obtaining DC outputs representing $\theta_{12}$, $\theta_{42}$, $\theta_{13}$, $\theta_{43}$, processing element 120 can use these obtained DC outputs to determine imbalance (e.g., gain and/or phase difference or imbalance) between transmitting elements $106_1$ and $106_4$, and generate calibration values for transmitting elements $106_1$ and $106_4$.

To determine a phase difference or phase imbalance between transmitting elements $106_1$ and $106_4$, processing element 120 can perform computation using the stored DC outputs. Note that $\theta_{12}=\theta_{TX1}+\theta_{RX2}+\theta_{C12}$. $\theta_{C12}$ can be the phase of the coupling between the transmitting element $106_1$ and the receiving element $106_2$, for example through the corresponding antennas. Similarly, $\theta_{42}=\theta_{TX4}+\theta_{RX2}+\theta_{C42}$. By subtracting these $\theta_{12}$ and $\theta_{42}$, the $\theta_{RX2}$ term which is common is eliminated resulting in $\theta_{12}-\theta_{42}=\theta_{TX1}-\theta_{TX4}+\theta_{C12}-\theta_{C42}$. $\theta_{C42}$ can be the phase of the coupling between the transmitting element $106_4$ and the receiving element $106_2$, for example through the corresponding antennas. Similarly, we can compute that $\theta_{13}-\theta_{43}=\theta_{TX1}-\theta_{TX4}+\theta_{C13}-\theta_{C43}$. By adding these two resulting equations, $2(\theta_{TX1}-\theta_{TX4})=(\theta_{12}-\theta_{42})+(\theta_{13}-\theta_{43})+(\theta_{C12}-\theta_{C43})+(\theta_{C13}-\theta_{C42})$. $\theta_{C13}$ can be phases of the coupling between the transmitting element $106_1$ and the receiving element $106_3$, for example through the corresponding antennas. $\theta_{C43}$ can be phases of the coupling between the transmitting element $106_4$ and the receiving element $106_3$, for example through the corresponding antennas. Assuming the four antennas are chosen with certain symmetries, the coupling terms can be equal and thus cancel out. Thus, the phase difference between transmitting elements $106_1$ and $106_4$ can be computed using the previously stored values as $((\theta_{12}-\theta_{42})+(\theta_{13}-\theta_{43}))/2$. Once this phase difference is obtained, the corresponding phase difference can be applied as the calibration value. In a similar manner, the phase difference between receiver elements $108_2$ and $108_3$ can be computed as $((\theta_{12}-\theta_{13})+(\theta_{42}-\theta_{43}))/2$. Further, in a similar manner, the gain difference between the transmitting elements and the gain difference between the receiving elements can be computed using the previously stored $g_{min,max}$ values and the obtained gain differences can be applied as a calibration. In some embodiments, rather than using two transmitter and two receivers, a larger number could be used in order to get more equations with more redundancy in order to reduce calibration uncertainties due to any measurement noise and uncertainties.

In an aspect, calibration of relatively large phased arrays can be critical to performance improvement because uncalibrated phased arrays can have signal loss as much as, for example, 6 decibels (dB) and sidelobe levels that can be up to, for example, 10 dB worse than expected values. The systems and methods described herein can avoid implementation of expensive techniques such as in-field measurements, or complicated digital signal processing. The methods described herein, including process 200, can be implemented for multi-tile phased arrays and for a variety of array geometries for both transmitting and receiving elements. The systems and methods described herein can avoid usage of digital hardware components such as ADCs and digital signal processors (DSP) in some embodiments. Further, the imbalance and calibration determination described herein can be applicable to various mismatches in phased arrays, such as local oscillator (LO) input phase mismatch between ICs and/or packages, intermediate frequency (IF) input phase mismatch between ICs and/or packages, circuit mismatch between elements of an IC, and circuit mismatch between elements across ICs and/or packages. It can be noted that the calibration can also be done using coupling between elements operating with different polarizations. For example, if the transmitting elements are operating in H polarization and the receiving elements are operating in V polarization, the procedure will still work. Additionally, it can be noted that transmitting elements and receiving elements may share the same physical antennas in some embodiments. The calibration described herein are applicable as long as the couplings are symmetrical or identical.

Figure 3:
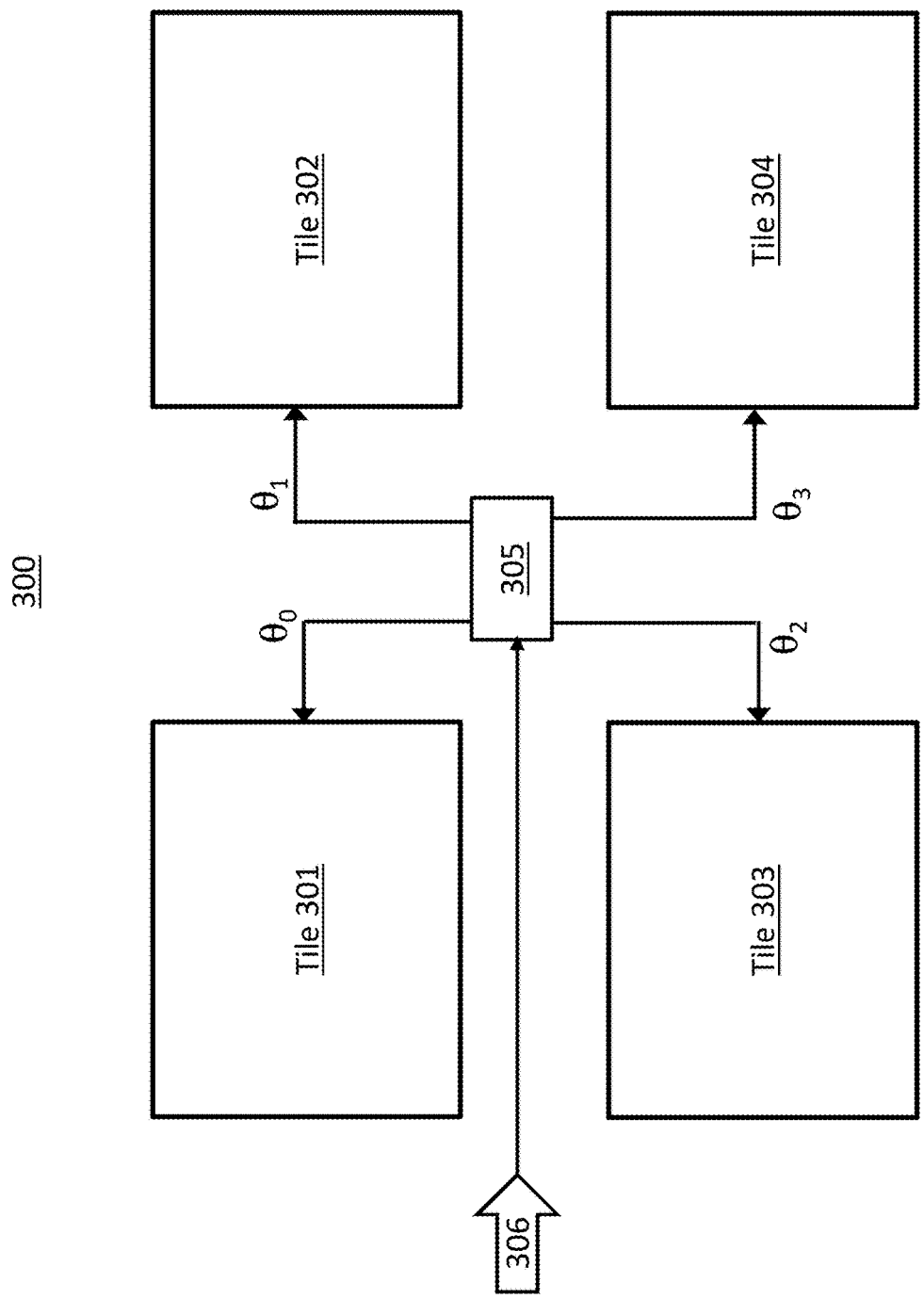
FIG. 3 illustrates a multi-tile phased array that can implement amplitude and phase alignment of phased array elements in one embodiment.

FIG. 3 illustrates a multi-tile phased array that can implement amplitude and phase alignment of phased array elements in one embodiment. A multi-tile phased array 300 shown in FIG. 3 can include four tiles, such as tile 301, 302, 303, 304. Although four tiles are shown in FIG. 3, multi-tile phased array 300 can include an arbitrary number of tiles. A splitter 305 can be connected to tiles 301, 302, 303, 304. Splitter 305 can be configured to receive a local oscillator (LO) signal 306 and distribute LO signal 306 to tiles 301, 302, 303, 304. The distribution performed by splitter 305, and the traces connecting splitter 305 to tiles 301, 302, 303, 304, can cause phase delays $\theta_0$, $\theta_1$, $\theta_2$, $\theta_3$, that can be different from one another, causing phase misalignment. If tiles 301, 302, 303, 304 are identical, then the differences among $\theta_0$, $\theta_1$, $\theta_2$, $\theta_3$, need to be calibrated. Array gain and sidelobe rejection can be significantly degraded in response to the phase misalignment among tiles 301, 302, 303, 304. The systems and methods herein can synchronize tiles in multi-tile phased array 300 (see FIG. 4A, FIG. 4B).

Figure 4A:
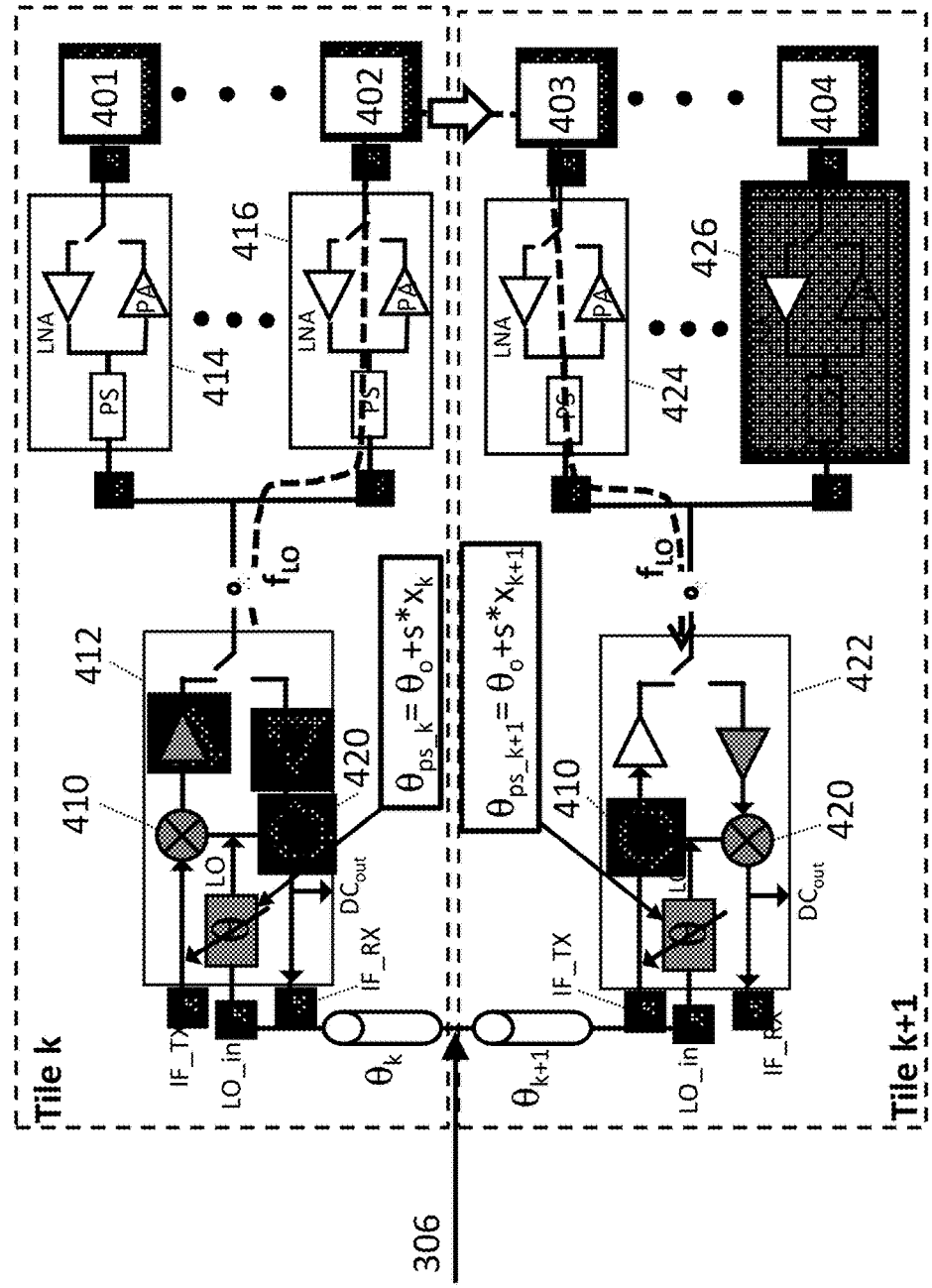
FIG. 4A illustrates an example implementation of amplitude and phase alignment of phased array elements in multi-tile phased array in one embodiment.
Figure 4B:
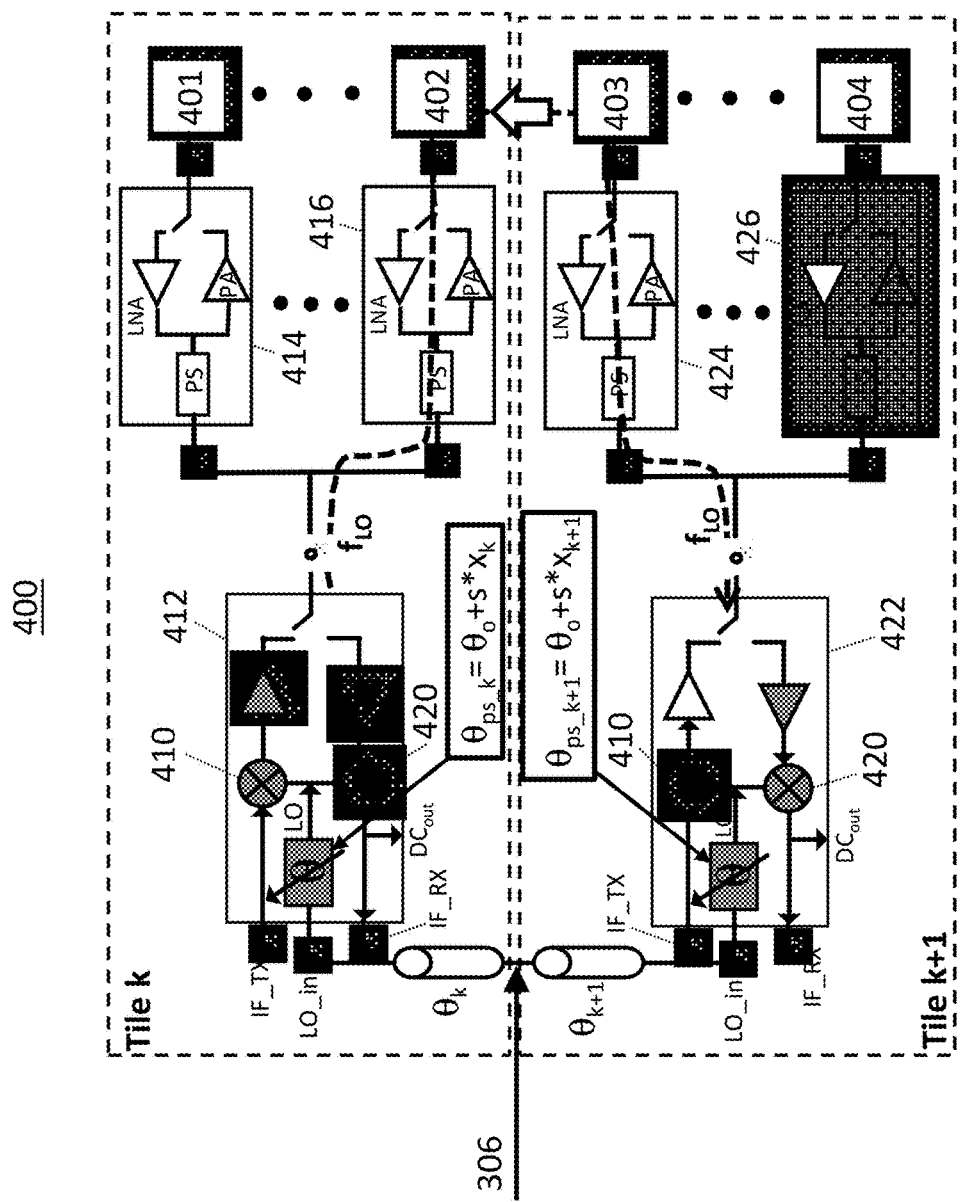
FIG. 4B illustrates a continuation of the example implementation of FIG. 4A in one embodiment.

FIG. 4A and FIG. 4B illustrate an example implementation of amplitude and phase alignment of phased array elements in multi-tile phased array in one embodiment. In one embodiment shown in FIG. 4A, a tile k and a tile k+1 can be adjacent tiles in a multi-tile phased array (e.g., multi-tile phased array 300 of FIG. 3). Tile k can include an element 412, a front end 414 connected to an antenna 401, and a front end 416 connected to an antenna 402. Tile k+1 can include an element 422, a front end 424 connected to an antenna 403, and a front end 426 connected to an antenna 404. Elements 412, 422 can be transceiver elements that can be implemented as a transmitting element (e.g., transmitting elements 106 in FIG. 1) and a receiving element (e.g., receiving element 108 in FIG. 1A to FIG. 2B). Transmission mode of front ends 414, 424 can be activated to transmit signals from elements 412, 422, and receiving mode of front ends 414, 424 can be activated to receive signals via antennas 401, 402. Each one of elements 412, 422 can include an up-converter mixer 410 for transmission mode and a down-converter mixer 420 for receiving mode. In one embodiment, the down-converter mixer 420 can implement the mixer 150 shown in FIG. 1A to FIG. 2B.

To synchronize tile k and tile k+1, a loop back path can be formed between element 412 to element 422, via front end 416, antenna 402, antenna 403, and front end 426. The loop back path can be bi-directional, and the direction of the loop back path can be based on activation of transmission mode or receiving mode of front ends 416, 426. Processing element 120 (see FIG. 1A to FIG. 2B) can determine a first combined loopback phase value for tile k and tile k+1 when tile k operates in transmission mode and tile k+1 operates in receiving mode, and a second combined loopback phase value for tile k and tile k+1 when tile k operates in receiving mode and tile k+1 operates in transmission mode. Processing element 120 can use the first and second combined loopback phase value to determine calibration offsets for calibrating tile k and tile k+1 in order to synchronize tile k and tile k+1.

In an embodiment shown in FIG. 4A, a transmission mode of front end 416 can be activated and a receiving mode of front end 426 can be activated. In response to the activations, the loop back path can have a direction from element 412 to element 422, and LO signal 306 can be transmitted from element 412 to element 422. LO signal 306 can be provided to an up-converter mixer 410 of element 412, and a DC offset can be induced without applying an intermediate frequency (IF) input. A global phase shifter code $x_k$ (e.g., phase setting) in tile k can be fixed as reference, and an IC (e.g., processing element 120 in FIG. 1A-FIG. 2B) can sweep global phase shifter code $x_{k+1}$ in tile k+1 until the DC signal (e.g., $DC_{out}$) being outputted by down-converter mixer 420 of tile k+1 reaches a zero-crossing point (e.g., changes its polarity from negative to positive). The value of $x_{k+1}$ at the zero-crossing point can be stored in memory device 122 (see FIG. 1A, FIG. 1B) as a phase value denoted as $a_1$.

In one embodiment, a phase $\theta_{LO\_k}$ of LO signal 306 LO phase Tile k is equivalent to $\theta_k + \theta_{ps\_k}$, where $\theta_{ps\_k}$ is the phase of a phase shifter in element 412 and can be defined as a digital linear code, such as $\theta_{psk} = \theta_o + s^* x_k$. This digital linear code can be generated by, for example, processing element 120 and can be used for sweeping the phase shifter in element 412. The sweep can increase a phase setting of the phase shifter linearly, starting from an initial phase $\theta_o$ and at increments of s, where s denotes a linear coefficient that can be predefined.

Using $\theta_{tx\text{-}ant}$ to denote the LO phase shift from the output of up-converter mixer 410 in element 412 to antenna 402, $\theta_{ant\text{-}rx}$ to denote the LO phase shift from antenna 403 to the input of down-converter mixer 420 in element 422, and $\theta_{coup}$ to denote the phase shift of antenna coupling between antennas 402, 403, the total loop-back phase shift from input of LO signal 306 to down-converter mixer 420 in element 422 can be $\theta_k + \theta_{ps\_k} + \theta_{tx\text{-}ant} + \theta_{coup} + \theta_{ant\text{-}rx}$. DCout being outputted from down-converter mixer 420 in element 422 can be a sinusoidal denoted as $V_{dc\_k+1} = A^*\cos(\theta_k + \theta_{ps\_k} + \theta_{tx\text{-}ant} + \theta_{coup} + \theta_{ant\text{-}rx} - (\theta_{k+1} + \theta_{ps\_k+1}))$. Since for the cosine function, polarity of $V_{dc\_k+1}$ will change at phase π/2, then $\theta_k + \theta_{ps\_k} + \theta_{tx\text{-}at} - \theta_{coup} + \theta_{ant\text{-}rx} - (\theta_{k+1} - \theta_{ps\_k+1}) = \pi/2$. The terms $\theta_{tx\text{-}ant} + \theta_{coup} + \theta_{ant\text{-}rx}$, based on symmetry of antennas 402, 403, can be simplified to a total phase shift $\theta_{tx\text{-}rx}$ in loop-back (e.g., from up-converter mixer output to down-converter mixer input through antenna coupling). The value of $x_{k+1}$, at the zero crossing point at phase π/2, was stored as the value $a_1$. Hence, an expression $\theta_k - \theta_{k+1} + s(x_k - a_1) = \pi/2 - \theta_{tx\text{-}rx}$, or $\theta_{k+1} + s^* a_1 = \theta_k + sx_k + \theta_{tx\text{-}rx} - \pi/2$, can capture the first phase imbalance between tile k and tile k+1 when tile k is functioning in transmission mode and tile k+1 is functioning in receiving mode.

In FIG. 4B, tile k can switch from transmitting mode to receiving mode, and tile k+1 can switch from receiving mode to transmitting mode. The loop back path can switch direction and LO signal 306 can be transmitted from element 422 to element 412. LO signal 306 can be provided to up-converter mixer 410 of element 412, and global phase shifter code $x_{k+1}$ in tile k+1 can be fixed as reference, and processing element 120 can sweep global phase shifter code $x_k$ in tile k until the DC signal (e.g., $DC_{out}$) being outputted by down-converter mixer 420 of tile k reaches a zero-crossing point (e.g., changes its polarity from positive to negative). The value of $x_k$ at the zero-crossing point can be stored in memory device 122 (see FIG. 1A, FIG. 1B) as a phase value denoted as $a_2$.

In one embodiment, a phase $\theta_{LO\_k}$ of LO signal 306 LO phase Tile k+1 is equivalent to $\theta_k + \theta_{ps\_k+1}$, where $\theta_{ps\_k+1}$ is the phase of a phase shifter in element 422 and can be defined as a digital linear code, such as $\theta_{ps\_k+1} = \theta_o + s^* x_{k+1}$. This digital linear code can be generated by, for example, processing element 120 and can be used for sweeping the phase shifter in element 412. The sweep can increase a phase setting of the phase shifter linearly, starting from an initial phase $\theta_o$ and at increments of $s^* x_{k+1}$, where s denotes a linear coefficient that can be predefined.

Using $\theta_{tx\text{-}ant}$ to denote the LO phase shift from the output of up-converter mixer 410 in element 422 to antenna 403, $\theta_{ant\text{-}rx}$ to denote the LO phase shift from antenna 402 to the input of down-converter mixer 420 in element 412, and $\theta_{coup}$ to denote the phase shift of antenna coupling between antennas 403, 402, the total loop-back phase shift from input of LO signal 306 to down-converter mixer 420 in element 412 can be $\theta_{k+1} + \theta_{ps\_k+1} + \theta_{tx\text{-}ant} + \theta_{coup} + \theta_{ant\text{-}rx}$. $DC_{out}$ being outputted from down-converter mixer 420 in element 412 can be a sinusoidal denoted as $V_{dc\_k} = A^*\cos(\theta_{k+1} + \theta_{ps\_k+1} + \theta_{tx\text{-}ant} + \theta_{coup} + \theta_{ant\text{-}rx} - (\theta_k + \theta_{ps\_k}))$. Since for the cosine function, polarity of $V_{dc\_k}$ will change at phase π/2, then $\theta_{k+1} - \theta_{ps\_k+1} + \theta_{tx\text{-}ant} + \theta_{coup} + \theta_{ant\text{-}rx} - (\theta_k + \theta_p s\_k) = \pi/2$. The terms $\theta_{tx\text{-}ant} + \theta_{coup} + \theta_{ant\text{-}rx}$, based on symmetry of antennas 402, 403, can be simplified to a total phase shift $\theta_{tx\text{-}rx}$ in loopback (e.g., from up-converter mixer output to down-converter mixer input through antenna coupling). The value of $x_k$, at the zero crossing point at phase π/2, was stored as the value $a_2$. Hence, an expression $\theta_k - \theta_{k+1} + s(x_k - a_2) = \theta_{tx\text{-}rx} - \pi/2$, or $\theta_{k+1} + s^* a_2 = \theta_k + sx_k + \pi/2 - \theta_{tx\text{-}rx}$, can capture the second phase imbalance between tile k and tile k+1 when tile k is functioning in receiving mode and tile k+1 is functioning in a transmitting mode.

A combination (e.g., sum) of the first phase imbalance $\theta_{k+1} + s^* a_1 = \theta_k + sx_k + \theta_{tx\text{-}rx} - \pi/2$ and the second phase imbalance $\theta_{k+1} + s^* a_2 = \theta_k + sx_k + \pi/2 - \theta_{tx\text{-}rx}$ yields $\theta_{k+1} + sx_k + 1 = \theta_k + sx_k$. A final value of phase shifter code $x_{k+1}$ to calibrate and synchronize tile k and tile k+1 can be $x_{k+1} = (a_1 + a_2)/2$. Since $\theta_{ps\_k} = \theta_o + s^* x_k$ and $\theta_{ps\_k+1} = \theta_o + s^* x_{k+}$, the expression $\theta_{k+1} + sx_{k+1} = \theta_k + sx_k$ can become $\theta_{k+1} + \theta_{ps\_k+1} = \theta_k + \theta_{ps\_k}$, indicating that tile k and tile k+1 are synchronized. Hence, using the at and $a_2$ values, settings $x_k + 1$ to $(a_1 + a_2)/2$ can synchronize the phase of LO signal 306 at tile k and tile k+1.

FIG. 5 illustrates a flow diagram relating to amplitude and phase alignment of phased array elements in one embodiment. The process 500 in FIG. 5 may be implemented using, for example, computer system 100 discussed above. An example process may include one or more operations, actions, or functions as illustrated by one or more of blocks 502, 504, 506, 508, and/or 510. Although illustrated as discrete blocks, various blocks may be divided into additional blocks, combined into fewer blocks, eliminated, performed in different order, or performed in parallel, depending on the desired implementation.

The process 500 may begin at block 502. At block 502, a processor (e.g., processing element 120 in FIG. 1A to FIG. 2B) can activate a transmitting element among a plurality of transmitting elements of a beamforming circuit. Process 500 can proceed from block 502 to block 504. At block 504, the processor can activate a receiving element among a plurality of receiving elements of a beamforming circuit.

Process 500 can proceed from block 504 to block 506. At block 506, the processor can receive a direct current (DC) signal that represents phase and amplitude of the activated transmitting element and the activated receiving element indicates a phase difference between the activated transmitting element and the activated receiving element.

Process 500 can proceed from block 506 to block 508. At block 508, the processor can adjust a setting of the beamforming circuit to receive additional DC signals that represent phases and amplitudes of the activated transmitting element and the activated receiving element under the adjusted setting.

Process 500 can proceed from block 508 to block 510. At block 510, the processor can determine calibration values for the beamforming circuit based on the DC signal and the additional DC signals.

In one embodiment, the processor can receive the DC signal and the additional DC signals from a mixer configured to mix an input of the activated transmitting element and an output of the activated receiving element to generate the DC signal and the additional DC signals.

In one embodiment, the sweeping can include sweeping a phase shifter of the activated receiving element. In one embodiment, the processor can store the DC signal and the additional DC signals in a memory.

In one embodiment, the activated transmitting element can be a first transmitting element, the activated receiving element can be a first receiving element, the DC signal can be a first DC signal, and the additional DC signals can be first additional DC signals. In response to receiving the first DC signal and the first additional DC signals, the processor can store the first DC signal in a memory. In response to storing the first DC signal, the processor can deactivate the first transmitting element and the first receiving element. The processor can activate a second transmitting element among the plurality of transmitting elements. The processor can activate a second receiving element among the plurality of receiving elements. The processor can receive a second DC signal that represents phase and amplitude of the second transmitting element and the second receiving element. The processor can determine the calibration values for the beamforming circuit based on the first DC signal, the first additional DC signals, the second DC signal, and the second additional DC signals.

In one embodiment, the DC signal and the additional DC signals can form a sinusoidal function of a combined phase and a combined gain of the activated transmitting element and the activated receiving element. The processor can determine the calibration values by determining the calibration values based on at least one selected from the group consisting of a maximum of the sinusoidal function, a minimum of the sinusoidal function, and a zero crossing point of the sinusoidal function.

In one embodiment, the processor can determine the calibration values to calibrate a gain setting of the beamforming circuit based on the maximum and the minimum of the sinusoidal function. The processor can determine the calibration values to calibrate a phase setting of the beamforming circuit based on the zero crossing point of the sinusoidal function.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for operating a beamforming circuit, the method comprising:
    activating a transmitting element among a plurality of transmitting elements of a beamforming circuit;
    activating a receiving element among a plurality of receiving elements of a beamforming circuit;
    receiving a direct current (DC) signal that represents phase and amplitude of the activated transmitting element and the activated receiving element;
    adjusting a setting of the beamforming circuit to receive additional DC signals that represent phases and amplitudes of the activated transmitting element and the activated receiving element under the adjusted setting, wherein adjusting the setting of the beamforming circuit comprises sweeping a phase shifter in at least one of the activated transmitting element and the activated receiving element and the sweeping includes setting the phase shifter to a plurality of different phase settings within a predefined amount of time; and
    determining calibration values for the beamforming circuit based on the DC signal and the additional DC signals.

2. The method of claim 1, wherein receiving the DC signal and the additional DC signals comprises receiving the DC signal and the additional DC signals from a mixer configured to mix an input of the activated transmitting element and an output of the activated receiving element to generate the DC signal and the additional DC signals.

3. The method of claim 1, wherein in response to the sweeping, the DC signal and the additional DC signals form a function of a combined phase of the activated transmitting element and the activated receiving element, a combined gain of the activated transmitting element and the activated receiving element and the adjusted settings.

4. The method of claim 1, wherein sweeping the phase shifter comprises sweeping a phase shifter of the activated receiving element.

5. The method of claim 1, further comprising storing the DC signal and the additional DC signals in a memory.

6. The method of claim 1, wherein the activated transmitting element is a first transmitting element, the activated receiving element is a first receiving element, the DC signal is a first DC signal, and the additional DC signals are first additional DC signals, and the method further comprising:
in response to receiving the first DC signal and the first additional DC signals, storing the first DC signal and the first additional DC signals in a memory; and
in response to storing the first DC signal and the first additional DC signals, deactivating the first transmitting element and the first receiving element; and
activating a second transmitting element among the plurality of transmitting elements; and
activating a second receiving element among the plurality of receiving elements;
receiving a second DC signal that represents phase and amplitude of the second transmitting element and the second receiving element;
adjusting the setting of the beamforming circuit to receive second additional DC signals that represent phase and amplitude of the second transmitting element and the second receiving element under the adjusted setting; and
determining the calibration values for the beamforming circuit based on the first DC signal, the first additional DC signals, the second DC signal, and the second additional DC signals.

7. The method of claim 1, wherein the DC signal and the additional DC signals form a function of a combined phase of the activated transmitting element and the activated receiving element, a combined gain of the activated transmitting element and the activated receiving element and the adjusted settings, and determining the calibration values comprises determining the calibration values based on at least one selected from the group consisting of:
extracted parameters of the function;
a maximum of the function;
a minimum of the function; and
a zero crossing point of the function.

8. The method of claim 7, wherein determining the calibration values comprises:
determining the calibration values to calibrate a gain setting of the beamforming circuit based on the maximum and the minimum of the function; and
determining the calibration values to calibrate a phase setting of the beamforming circuit based on the zero crossing point of the function.

9. The method of claim 1, wherein:
the activated transmitting element is in a first tile of a multi-tile phased array;
the activated receiving element is in a second tile of a multi-tile phased array; and
the DC signal is received from a down-converter mixer of the activated receiving element.

10. An apparatus comprising:
a plurality of transmitting elements;
a plurality of receiving elements;
a mixer configured to:
in response to being connected to a transmitting element among the plurality of transmitting element and a receiving element among the plurality of receiving element, generate a DC signal that represents phase and amplitude of the activated transmitting element and the activated receiving element;
output the DC signal to a processor to determine calibration values for the apparatus based on the DC signal; and
in response to adjustments to a phase shifter in one of the transmitting element connected to the mixer and the receiving element connected to the mixer, output additional DC signals that represent phases and amplitudes of the transmitting element and the receiving element under the adjustments to the phase shifter, wherein the adjustments to the phase shifter is a sweep of the phase shifter, and the sweep includes setting the phase shifter to a plurality of different phase settings within a predefined amount of time.

11. The apparatus of claim 10, wherein the mixer is configured to mix an input of the transmitting element and an output of the receiving element to generate the DC signal.

12. The apparatus of claim 10, wherein the transmitting element is a first transmitting element, the receiving element is a first receiving element, the DC signal is a first DC signal, and the additional DC signals are first additional DC signals, and the mixer is further configured to:
in response to being disconnected from the first transmitting element and the first receiving element, and in response to being connected to a second transmitting element and a second receiving element, generate a second DC signal that represents phase and amplitude of the second transmitting element and the second receiving element;
in response to the adjustments to another phase shifter in one of the second transmitting element and the second receiving element, output second additional DC signals that represent phases and amplitudes of the second transmitting element and the second receiving element under the adjustments to said another phase shifter; and
output the second DC signal and second additional DC signals to the processor.

13. The apparatus of claim 10, wherein:
the activated transmitting element is in a first tile of a multi-tile phased array;
the activated receiving element is in a second tile of a multi-tile phased array; and
the mixer is a down-converter mixer of the activated receiving element.

14. A system comprising:
a beamforming circuit including a plurality of transmitting elements and a plurality of receiving elements;
a mixer;
at least one processor configured to:
activate a transmitting element among the plurality of transmitting elements;
activate a receiving element among the plurality of receiving elements;
the mixer being configured to mix an input of the activated transmitting element and an output of the activated receiving element to generate a DC signal that represents phase and amplitude of the activated transmitting element and the activated receiving element;

the at least one processor is further configured to:
  receive the DC signal from the mixer;
  adjust a setting of the beamforming circuit to receive additional DC signals from the mixer, wherein the additional DC signals represent phases and amplitudes of the activated transmitting element and the activated receiving element under the adjusted setting, wherein adjustment of the setting of the beamforming circuit comprises sweeping a phase shifter in at least one of the activated transmitting element and the activated receiving element and the sweeping includes setting the phase shifter to a plurality of different phase settings within a predefined amount of time; and
  determine calibration values for the beamforming circuit based on the DC signal and the additional DC signals.

15. The system of claim 14, wherein:
in response to the sweep, the DC signal and the additional DC signals form a function of a combined phase of the activated transmitting element and the activated receiving element, a combined gain of the activated transmitting element and the activated receiving element and the adjusted settings.

16. The system of claim 14, wherein:
the activated transmitting element is a first transmitting element;
the activated receiving element is a first receiving element;
the DC signal is a first DC signal;
the additional DC signals are first additional DC signals;
the at least one processor is configured to:
  in response to receiving the first DC signal, store the first DC signal and first additional DC signals in a memory; and
  in response to storing the first DC signal and first additional DC signals, deactivate the first transmitting element and the first receiving element;
  activate a second transmitting element among the plurality of transmitting elements; and
  activate a second receiving element among the plurality of receiving elements;
the mixer is configured to generate a second DC signal that represents phase and gain of the second transmitting element and the second receiving element;
the at least one processor is further configured to:
  receive the second DC signal from the mixer;
  adjust a setting of the beamforming circuit to receive second additional DC signals from the mixer, wherein the second additional DC signals represent phases and amplitudes of the second transmitting element and the second receiving element under the adjusted setting; and
  determine the calibration values for the beamforming circuit based on the first DC signal, the first additional DC signals, the second DC signal, and the second additional DC signals.

17. The system of claim 14, wherein the DC signal and the additional DC signals form a function of a combined phase of the activated transmitting element and the activated receiving element, a combined gain of the activated transmitting element and the activated receiving element and the adjusted settings, and the at least one processor is configured to determine the calibration values based on at least one selected from the group consisting of:
  extracted parameters of the function;
  a maximum of the function;
  a minimum of the function; and
  a zero crossing point of the function.

18. The system of claim 17, wherein the at least one processor is configured to:
  determine the calibration values to calibrate a gain setting of the beamforming circuit based on the maximum and the minimum of the function; and
  determine the calibration values to calibrate a phase setting of the beamforming circuit based on the zero crossing point of the function.

19. The system of claim 14, wherein:
the activated transmitting element is in a first tile of a multi-tile phased array;
the activated receiving element is in a second tile of a multi-tile phased array; and
the mixer is a down-converter mixer of the activated receiving element.

* * * * *